US012515311B2

(12) United States Patent
Ding et al.

(10) Patent No.: US 12,515,311 B2
(45) Date of Patent: Jan. 6, 2026

(54) DEVICE FOR HUMAN TRUNK ASSISTANCE

(71) Applicant: NATIONAL UNIVERSITY OF SINGAPORE, Singapore (SG)

(72) Inventors: Shuo Ding, Singapore (SG); Haoyong Yu, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 194 days.

(21) Appl. No.: 18/285,147

(22) PCT Filed: Apr. 5, 2022

(86) PCT No.: PCT/SG2022/050192
§ 371 (c)(1),
(2) Date: Sep. 29, 2023

(87) PCT Pub. No.: WO2022/216229
PCT Pub. Date: Oct. 13, 2022

(65) Prior Publication Data
US 2024/0189979 A1 Jun. 13, 2024

(30) Foreign Application Priority Data

Apr. 5, 2021 (SG) .............................. 10202103448P
Nov. 18, 2021 (CN) .......................... 202111368770.8

(51) Int. Cl.
B25J 9/00 (2006.01)
B25J 9/10 (2006.01)
(Continued)

(52) U.S. Cl.
CPC ........... B25J 9/0006 (2013.01); B25J 9/1045 (2013.01); B25J 9/14 (2013.01); B25J 9/1633 (2013.01); B25J 9/1664 (2013.01)

(58) Field of Classification Search
CPC ........ B25J 9/0006; B25J 9/104; B25J 9/1045; B25J 9/14; B25J 9/1633; B25J 9/1664; B25J 17/0266
See application file for complete search history.

(56) References Cited

U.S. PATENT DOCUMENTS

2014/0330431 A1* 11/2014 Hollander ................ A61H 3/00
29/428
2017/0319421 A1* 11/2017 Julin ........................ A61H 3/00
(Continued)

FOREIGN PATENT DOCUMENTS

CN 112025681 A 12/2020

OTHER PUBLICATIONS

Hofmann Urs A. T. et al., "Design and Evaluation of a Bowden-Cable-Based Remote Actuation System for Wearable Robotics", IEEE Robotics and Automation Letters, Feb. 26, 2018, vol. 3, No. 3, pp. 2101-2108, [Retrieved on Jun. 16, 2022] <DOI: 10.3929/ETHZ-B-000257080>.

(Continued)

Primary Examiner — Dale Moyer
(74) Attorney, Agent, or Firm — HARNESS, DICKEY & PIERCE, P.L.C.

(57) ABSTRACT

The present application relates to devices that assist the human trunk, and provides a device for human trunk assistance, which includes: a trunk link (1), coupled to an upper back of a user through back straps (2); two thigh links (3), coupled to left and right thighs of the user through leg straps (4) respectively; two hip joint hinges (5), placed align to left and right hip joints of the user respectively, and configured for rotatably coupling the trunk link (1) and the two thigh links (3); and a torque generator (6), coupling to the two hip (Continued)

joint hinges (5) through Bowden cables (7), and configured to generate an assist torque to reduce moment burden to the user.

19 Claims, 25 Drawing Sheets

(51) Int. Cl.
*B25J 9/14* (2006.01)
*B25J 9/16* (2006.01)

(56) References Cited

U.S. PATENT DOCUMENTS

2019/0009405 A1* 1/2019 Ko .................. B25J 9/0006
2020/0011406 A1* 1/2020 Julin ................ B25J 9/0006
2020/0179218 A1* 6/2020 Katoh .............. A61H 1/0244

OTHER PUBLICATIONS

International Search Report issued in PCT/SG2022/050192, mailed Jul. 7, 2022; ISA/SG.

* cited by examiner

DEVICE FOR HUMAN TRUNK ASSISTANCE

CROSS-REFERENCE TO RELATED APPLICATIONS

This application is a U.S. National Phase Application under 35 U.S.C. 371 of International Application No. PCT/SG2022/050192, filed on Apr. 5, 2022, which claims the benefit of Singaporean patent application number 10202103448P, filed on Apr. 5, 2021, which claims the benefit of Chinese Patent Application No. 202111368770.8, filed on Nov. 18, 2021. The entire disclosures of the above applications are incorporated herein by reference.

TECHNICAL FIELD

The present application relates to devices that assist the human trunk, more particularly, to a portable device that is worn by a user and reduces the moment burden on the waist joint and reduce compressive load on the back during lifting works. The device can be applied in many scenarios such as factories, warehouses, hospital, airport, construction, delivery, daily living assistance and so on.

BACKGROUND

Work-related musculoskeletal disorders (WMSDs) are estimated to cost $250 billion every year in the USA. Back injury is the most prevalent WMSDs and it takes a long time to recover from the back injury. Numerous works can cause the back injury such as baggage handling, patient care, house building, car assembly and so on. In these works, workers need to frequently bend their trunk, lift loads up or hold them, and put them down, which generates a large moment burden on the L5/S1 area of the spine and causes the muscle fatigues and injuries of back. Therefore, there is a great need for a trunk assist device that can provide assistance to the waist joint and relieve the muscle fatigues.

SUMMARY

The present application is directed to a device for human trunk assistance, providing a restorative torque between trunk and thighs and reducing the muscle fatigue of back in bending and lifting works.

In general, the present application provides a device for human trunk assistance, which includes:
 a trunk link, coupled to an upper back of a user through back straps;
 two thigh links, coupled to left and right thighs of the user through leg straps respectively;
 two hip joint hinges, placed align to left and right hip joints of the user respectively, and configured for rotatably coupling the trunk link and the two thigh links; and
 a torque generator, coupling to the two hip joint hinges through Bowden cables, and configured to generate an assist torque to reduce moment burden to the user.

According to an embodiment of the present application, the trunk link includes:
 two hip links, rotatably coupled with the two hip joint hinges, respectively;
 two cable connectors, respectively fixed on the two hip links configured to connect the Bowden cables;
 two upper hip links, rotatably coupled with the two hip links respectively by upper hip hinges;
 two waist links, respectively connect to the two upper hip links, then are fixed to a waist connector; and
 a back link, an end of the back link being fixed on the waist connector, and the other end of the back link being rotatably coupled with an upper back plate, and the upper back plate is configured for following a position change of an upper back of the user.

According to an embodiment of the present invention, each of the hip joint hinges includes:
 a pulley, which is fixed with the thigh link and rotatably coupled with the hip link;
 a hinge support, rotatably coupled with the pulley and connects the back straps; and
 two end caps, configured to lock an axial position of the pulley.

According to an embodiment of the present invention, one end of the Bowden cable is stuck in the pulley and the other end connects the torque generator.

According to an embodiment of the present invention, the torque generator is attached to a waist position and drives the two hip joint hinges by the Bowden cables.

According to an embodiment of the present invention, the torque generator includes:
 a support plate,
 two shaft bases, respectively fixed on two ends of the support plate;
 two outer sliding plates, movably between the two shaft bases;
 two inner sliding plates, movably between two outer sliding plates; and
 a compression spring, attached between the inner sliding plates;
 wherein one end of the Bowden cable is fixed to the outer sliding plate and the other end connects to one of the hip joint hinge, and one end of the Bowden cable is fixed to the outer sliding plate and the other end connects the other one of the hip joint hinge.

According to an embodiment of the present invention, the torque generator further includes:
 two shafts, placed parallel to each other and are supported by the shaft bases; and
 the two outer sliding plates and the two inner sliding plates are connected to the shafts and are able to move smoothly along the shafts.

According to an embodiment of the present invention, the torque generator further includes:
 a spring sleeve, fixed on a middle of the support plate and is further configured to guide the compression spring.

According to an embodiment of the present invention, torque generator further includes:
 elastic ropes, connected between the outer sliding plates and fixed points of the device, and configured to tension the Bowden cables.

According to an embodiment of the present invention, the outer sliding plates are at preset initial positions when the user stands straight, and a distance between the outer sliding plates is larger than an initial length of the compression spring.

According to an embodiment of the present invention, when the user raises one leg to a predetermined angle A, the compression spring does not compress, where at the predetermined angle A, one of the outer sliding plates is pulled by the Bowden cable to contact with the corresponding inner sliding plate.

According to an embodiment of the present invention, when the user bends or squats an angle between the trunk and thighs is reduced by less than or equal to A/2, the compression spring does not compress, and when the user bends or squats an angle between the trunk and thighs is reduced by more than A/2, the compression spring is compressed and generates an assist torque at the hip joint hinges to reduce moment burden of a waist joint of the user.

According to an embodiment of the present invention, the torque generator is installed on the trunk link and drives both hip joint hinges via the Bowden cables, and device further includes a sensing and control box, and the sensing and control box is also installed on the trunk link and provides control signal and energy to the torque generator.

According to an embodiment of the present invention, the torque generator includes:
- a prime mover, including a motor and a ball screw fixed on a base plate, the base plate being provided with a slide rail; and
- a slider, connected to the ball screw and movable along the slide rail by the prime mover;
- wherein the Bowden cables are connected between the slider and the hip joint hinges so as to provide a resistance moment between the trunk link and thigh links.

According to an embodiment of the present invention, the Bowden cables includes an outgoing Bowden cable and a returning Bowden cable, and the torque generator further includes two rollers, one for the outgoing Bowden cable and one for the returning Bowden cable, are installed on the slider; the outgoing Bowden cable is wound on the roller and its two ends respectively connect the two hip joint hinges, and the returning Bowden cable is wound on the other roller and its two ends also connect the two hip joint hinges respectively.

According to an embodiment of the present invention, the Bowden cables includes an outgoing Bowden cable, and the torque generator further includes a roller for the outgoing Bowden cable, is installed on the slider; the outgoing Bowden cable is wound on the roller and its two ends respectively connect the two hip joint hinges, and the slider moves backward and pulls the outgoing Bowden cable by the motor.

According to an embodiment of the present invention, the torque generator includes:
- a base plate;
- a prime mover, including a motor fixed on the base plate
- a slide rail, fixed on the base plate;
- a slider, movable along the slide rail 605 by the motor; and
- a prime pulley, coupled with the motor;
- wherein the motor drives the prime pulley to pull the Bowden cables to drive the slider moving backward.

According to an embodiment of the present invention, the prime pulley includes an inner ring and an outer ring, a plurality of elastic elements are arranged between the inner ring and the outer ring and configured to measure an angle shift between the inner ring and the outer ring.

According to an embodiment of the present invention, the prime mover includes a hydraulic cylinder, or a pneumatic cylinder.

According to an embodiment of the present invention, the sensing and control box is configured to monitor a motion condition of the user and a force on the Bowden cables to send a control signal to the torque generator to tension the Bowden cables in a working condition, and to ensure the force of the Bowden cables are zero in a non-working condition.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

Herein, embodiments of the present application are described in detail, and examples of the embodiment are illustrated in the accompanying figures; wherein, an always unchanged reference number or similar reference numbers represent(s) identical or similar components or components having identical or similar functionalities. The embodiment described below with reference to the accompanying figures is illustrative and intended to illustrate the present application, but should not be considered as any limitation to the present application.

It is noted that when a component is referred to as being "fixed to" or "disposed on" another component, it can be directly or indirectly on another component. When a component is referred to as being "connected to" another component, it can be directly or indirectly connected to another component.

In the description of the present application, it needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application.

In a First Embodiment of the Present Application

Figure 1:
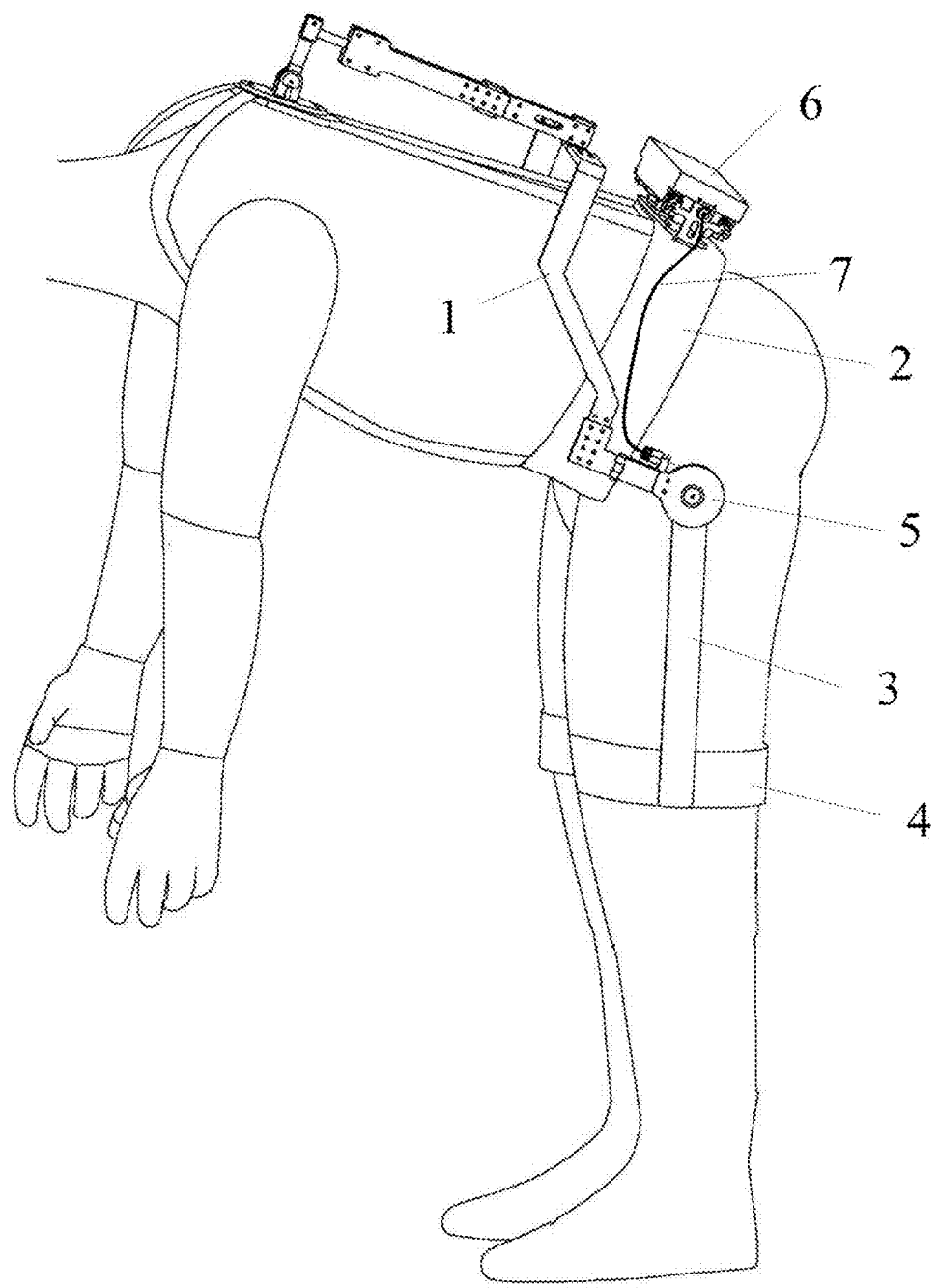
FIG. 1 shows a side view of a device for human trunk assistance that is worn by a user in lifting work provided by a first embodiment of the present application.
Figure 2:
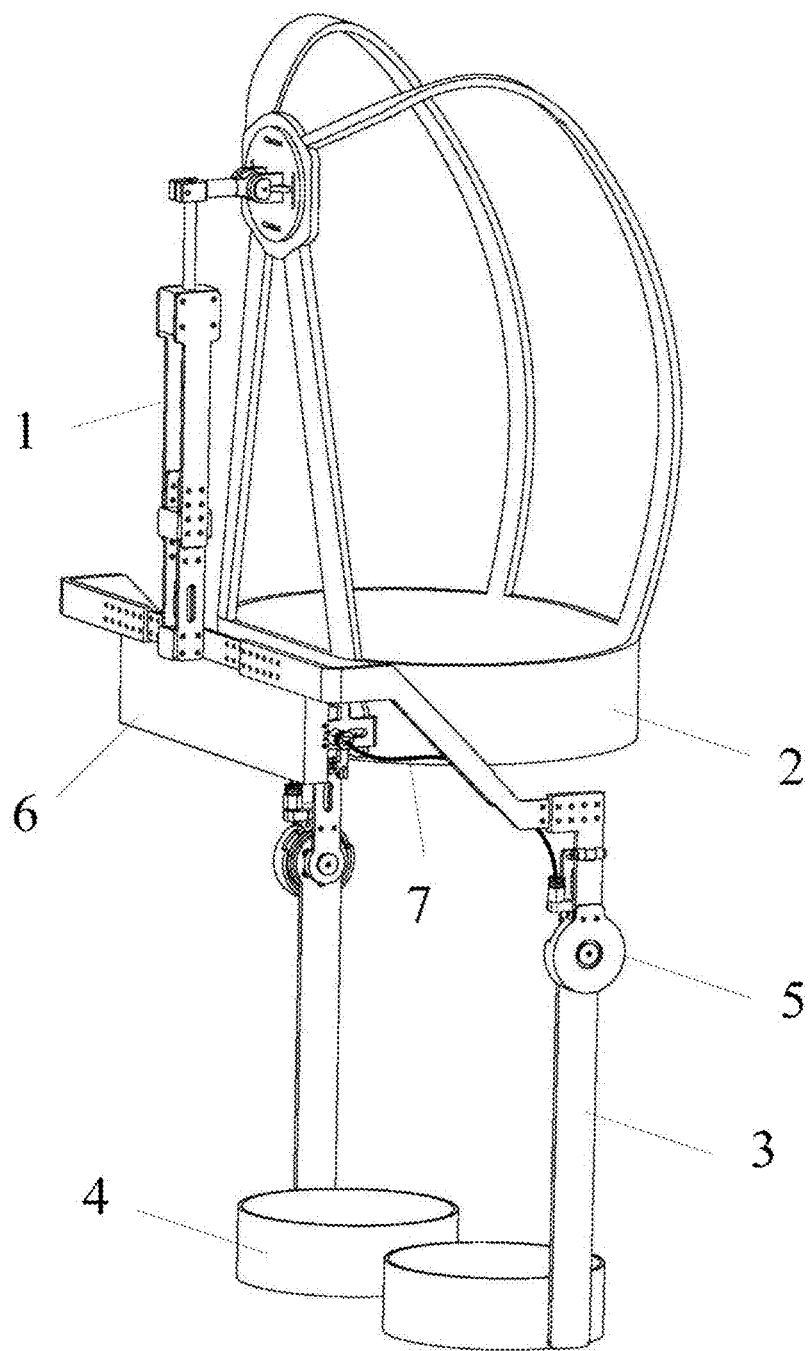
FIG. 2 shows a side view of the device for human trunk assistance provided by a first embodiment of the present application.

FIG. 1 shows a side view of a device for human trunk assistance that is worn by a user in lifting work. The device includes a trunk link 1, back straps 2, two thigh links 3, leg straps 4, two hip joint hinges 5, a torque generator 6 and Bowden cables 7. The trunk link 1 is coupled to the user's upper back by back straps 2 and two thigh links 3 are coupled to the user's left and right thighs by leg straps 4, respectively. Two hip joint hinges 5 are placed align to the user's left and right hip joints respectively, rotatably coupling the trunk link 1 and thigh links 3. The torque generator 6 is attached to the waist position and drives the hip joint hinges 5 by Bowden cables 7. FIG. 2 shows a side view of the device for human trunk assistance.

Figure 3:
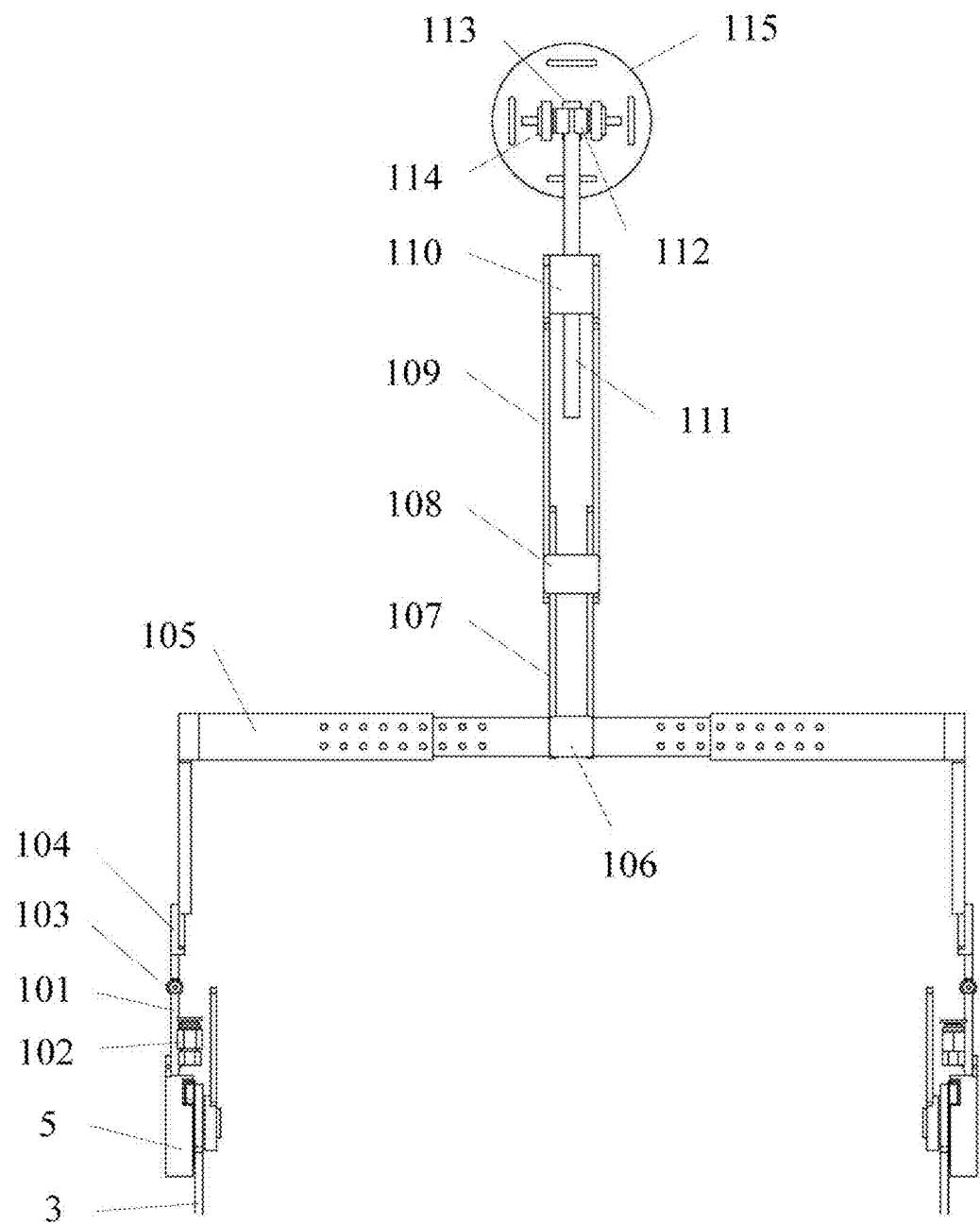
FIG. 3 shows a back view of the trunk link, where the torque generator, back straps and Bowden cables are hidden provided by a first embodiment of the present application.
Figure 4:
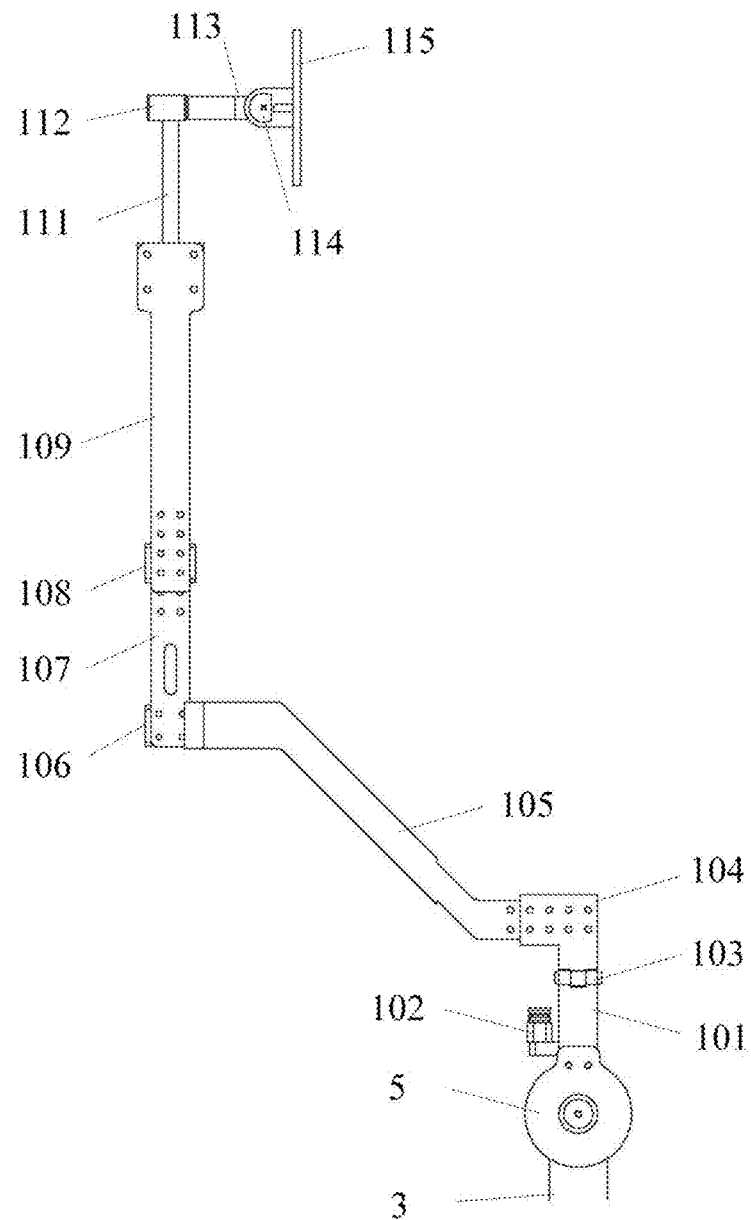
FIG. 4 shows a side view of the trunk link, where the torque generator, back straps and Bowden cables are hidden provided by a first embodiment of the present application.
Figure 5:
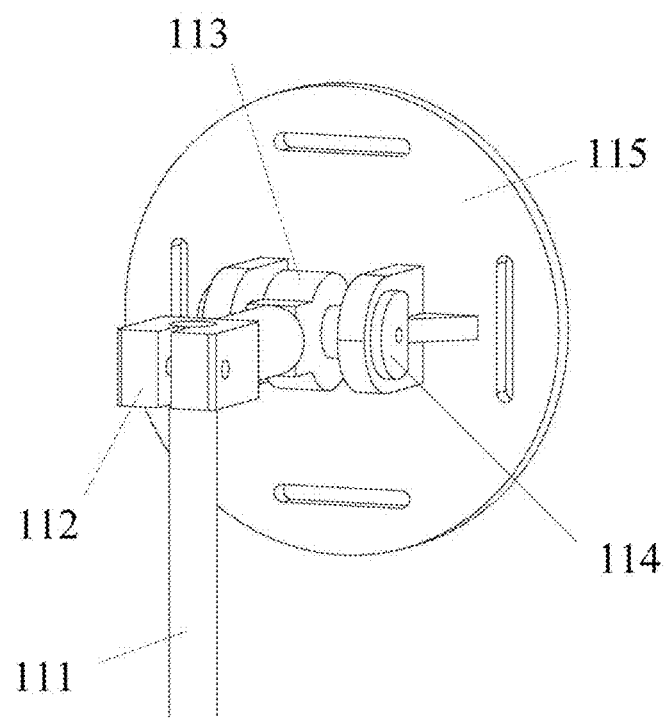
FIG. 5 shows a close-up view of the upper end of the trunk link provided by a first embodiment of the present application.
Figure 6:
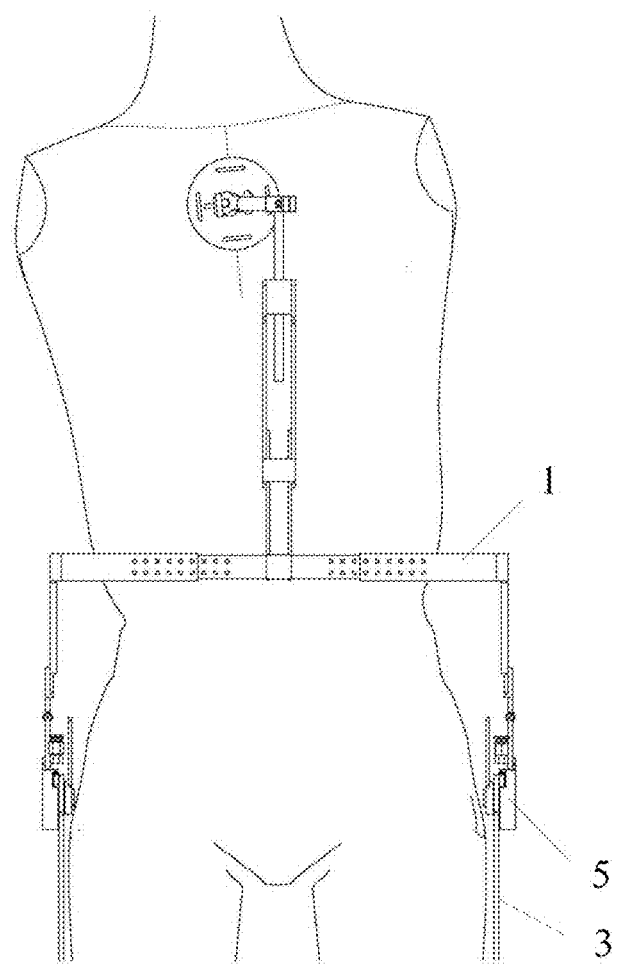
FIG. 6 schematically shows the device adapts to the tilting movement of the torso, where the torque generator, back straps and Bowden cables are hidden provided by a first embodiment of the present application.
Figure 7:
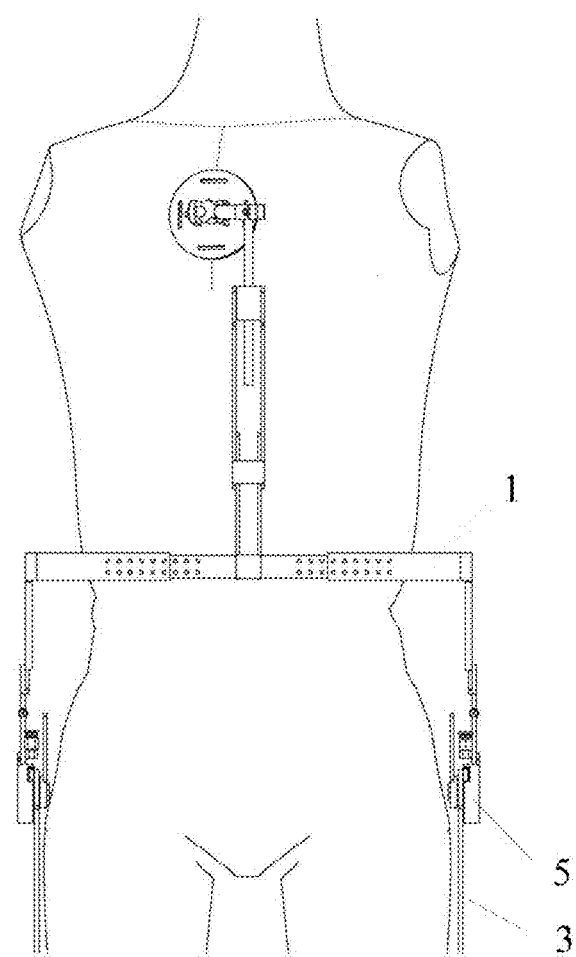
FIG. 7 schematically shows the device adapts to the turning movement of the torso, where the torque generator, back straps and Bowden cables are hidden provided by a first embodiment of the present application.

FIG. 3 and FIG. 4 respectively show the back and side view of the trunk link, where the torque generator, back straps and Bowden cables are hidden. FIG. 5 shows a close-up view of the upper end of the trunk link. The trunk link 1 includes two hip links 101 that are rotatably coupled with the left and right hip joint hinges 5, respectively. Two cable connectors 102 are respectively fixed on the left and right hip links 101 to connect the Bowden cables 7. Two upper hip links 104 are rotatably coupled with the left and right hip links 101 respectively by the upper hip hinges 103. This can allow the abduction and adduction motions of the legs. Two waist links 105 respectively connect to the left and right upper hip links 104, then are fixed to a waist connector 106. Two low back links 107 are fixed on the waist connector 106 and connect the upper back links 109 by a middle connector 108. The size of the device can be changed and adapts to different body shapes by adjusting the relative position of the links. A linear bearing 110 is support by the upper back links 109 and linearly couples with a back shaft 111. A connect rod 112 is locked with the back shaft 111 in one end and connects a universal bearing 113 in the other end. The universal bearing 113 is rotatably coupled with an upper back plate 115 by an upper back hinge 114. When the user moves the torso, the back shaft 111 slides and rotates relative to the linear bearing 110 and the universal bearing 113 rotates relative to the upper back plate 115, thereby the upper back plate 115 can follow the position change of the upper back. As shown in FIG. 6 and FIG. 7, the device adapts to not only the bending movement but also the tilting and turning movements of the torso.

Figure 8:
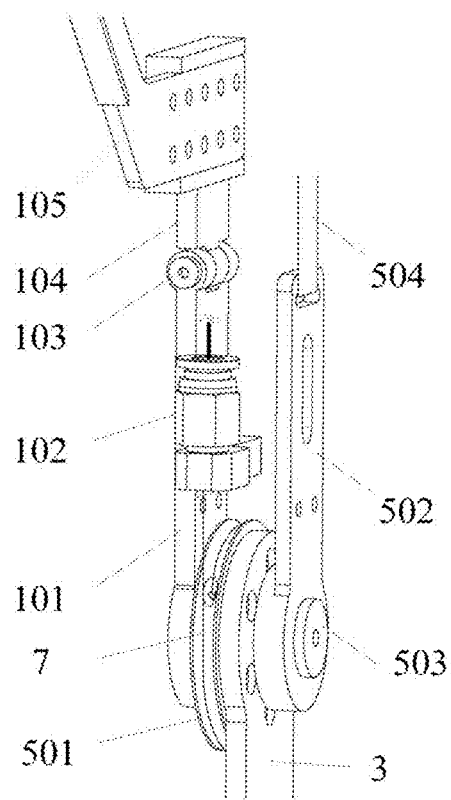
FIG. 8 shows a close-up view of the hip joint hinge, where the hip joint hinge shell is hidden provided by a first embodiment of the present application.

FIG. 8 shows a close-up view of the hip joint hinge, where the hinge shell is hidden. The hip joint hinge 5 includes a pulley 501 which is fixed with the thigh link 3 and rotatably coupled with the hip link 101 by shaft and bearings. A hinge support 502 is also rotatably coupled with the pulley 501 and connects the back straps 2 via bandage 504. Two end caps 503 are used to lock the axial position of the bearings. One end of the Bowden cable 7 is stuck in the small hole on the pulley 501 and the other end connects the torque generator 6.

Figure 9:
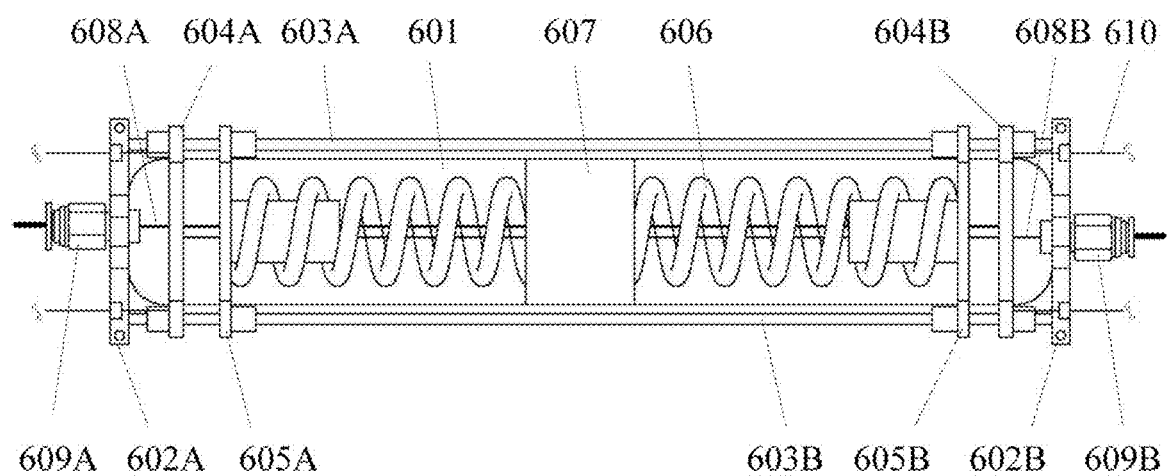
FIG. 9 shows a top view of the torque generator, where the protecting shell is hidden provided by a first embodiment of the present application.
Figure 10:
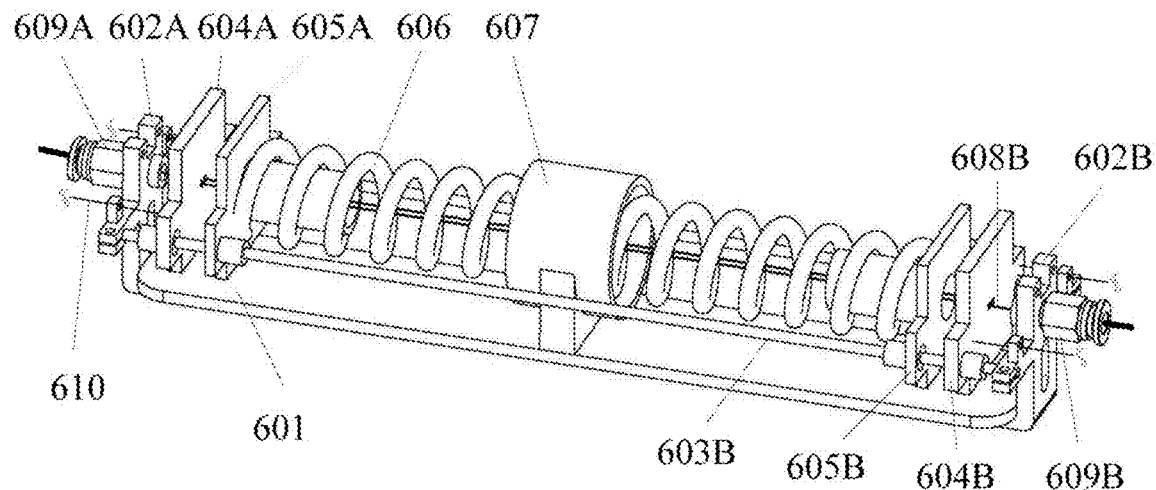
FIG. 10 shows a side view of the torque generator, where the protecting shell is hidden provided by a first embodiment of the present application.

FIG. 9 and FIG. 10 respectively show the top and side views of the torque generator, where the protecting shell is hidden. The torque generator 6 includes a support plate 601 and two shaft bases 602A and 602B are fixed on it. Two shafts 603A and 603B are placed parallel to each other and are supported by the shaft bases 602A and 602B. Two outer sliding plates 604A and 604B and two inner sliding plates 605A and 605B are integrated with linear bearings and can move smoothly along the shafts 603A and 603B. A compression spring 606 is attached to the inner sliding plates 605A and 605B and is guided by the cylindrical structure of 605A and 605B. A spring sleeve 607 is fixed on the middle of the support plate 601 and is also used to guide the spring 606. One end of the Bowden cable 608A is fixed to the outer sliding plate 604B and the other end connects the pulley of the left hip hinge via a cable connector 609A. One end of the Bowden cable 608B is fixed to the outer sliding plate 604A and the other end connects the pulley of the right hip hinge via a cable connector 609B. In some embodiments, elastic ropes 610 are added to the outer sliding plate 604A and 604B and connect to some fixed point of the device. The elastic ropes 610 are used to tension the Bowden cables 608A and 608B and are not shown in following FIGs for simplification.

Figure 11:
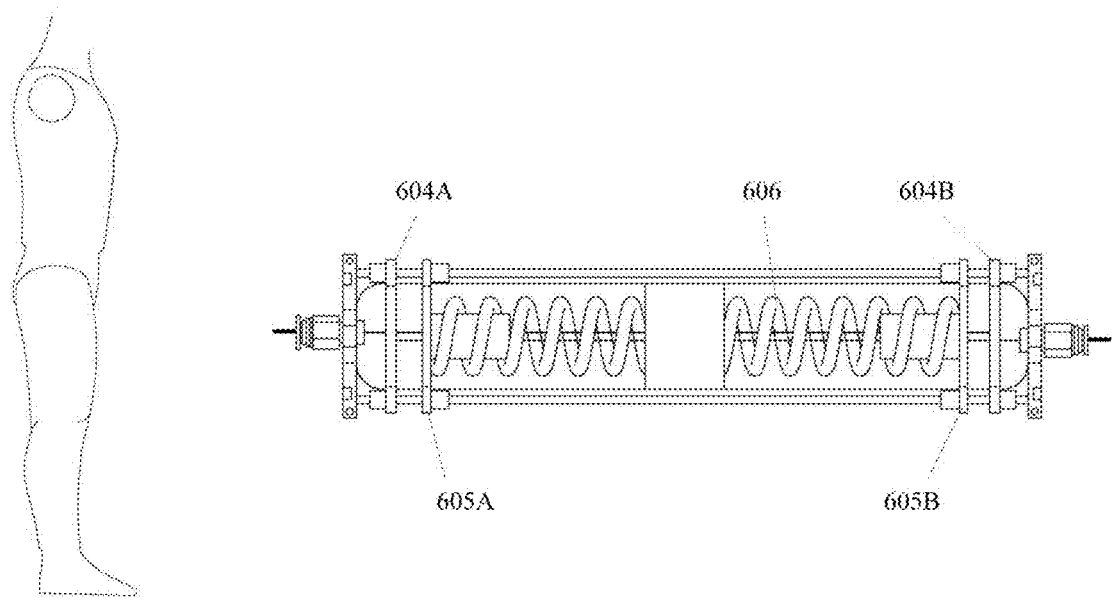
FIG. 11 shows the state of the torque generator when a user stands straight provided by a first embodiment of the present application.

FIG. 11 shows the state of the torque generator when a user stands straight. When a user stands straight, the outer sliding plates 604A and 604B are at the preset initial positions. The distance between the outer sliding plates 604A and 604B is larger than the initial length of the compression spring 606 adding the thickness of the inner sliding plates 605A and 605B. The compression spring 606 is not compressed and the force on the Bowden cables 7 is very small (only the pretension force). Thus, the device does not apply torque to the user.

Figure 12:
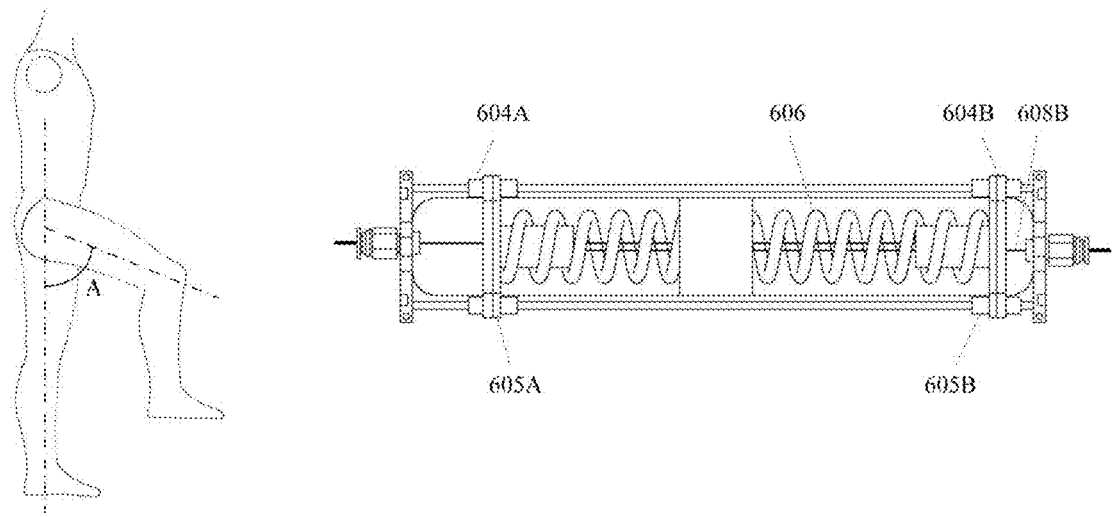
FIG. 12 shows the state of the torque generator when a user raises one leg (for example the right leg) to a predetermined angle A provided by a first embodiment of the present application.

FIG. 12 shows the state of the torque generator when a user raises one leg (for example the right leg) to a predetermined angle A. The outer sliding plate 604A is pulled by the Bowden cable 608B to the right side and contacts with the inner sliding plate 605A, thereby the sliding plates 604A, 605A, 605B and the spring 606 all move to the right side, until the inner sliding plate 605B and the outer sliding plate 604B contact each other. At this time, the distance between the outer sliding plates 604A and 604B equals to the initial length of the compression spring 606 adding the thickness of the inner sliding plates 605A and 605B. The compression spring 606 is not compressed and the force on the Bowden cables 7 is very small (the pretension force). Thus, the device does not apply torque to the user.

Figure 13:
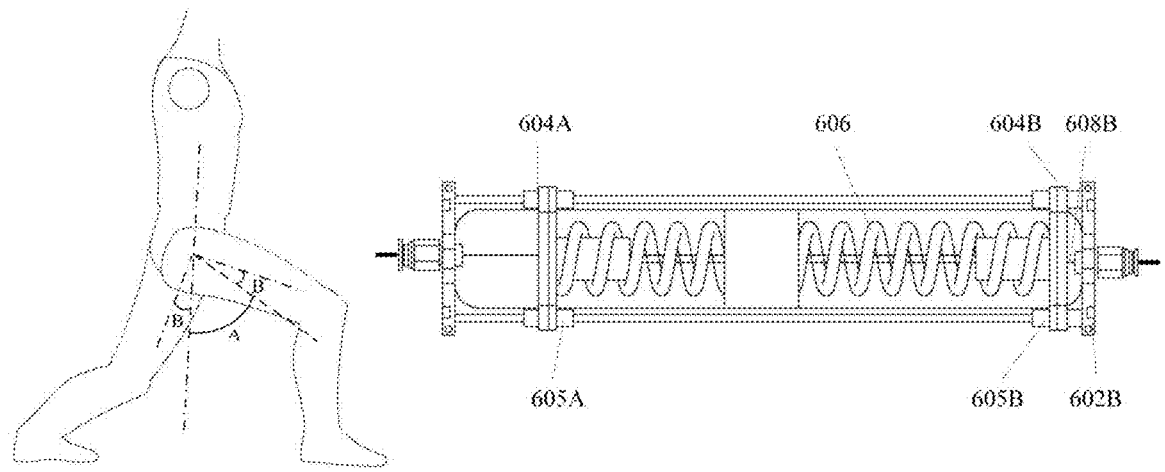
FIG. 13 shows the state of the torque generator when a user strides, for example the left leg goes backward to a predetermined angle B and the right leg goes forward to an angle (A+B) provided by a first embodiment of the present application.

FIG. 13 shows the state of the torque generator when a user strides, for example the left leg goes backward to a predetermined angle B and the right leg goes forward to an angle (A+B). When the left leg goes backward to a predetermined angle B, the outer sliding plate 604B is pulled by the elastic ropes to the right side and contacts the shaft base 602B. Therefore, the right leg can go forward freely to the angle (A+B). At this time, the distance between the outer sliding plates 604A and 604B equals to the initial length of the compression spring 606 adding the thickness of the inner sliding plates 605A and 605B. The compression spring 606 is not compressed and the force on the Bowden cables 7 is very small (the pretension force). Thus, the device does not apply torque to the user.

Figure 14:
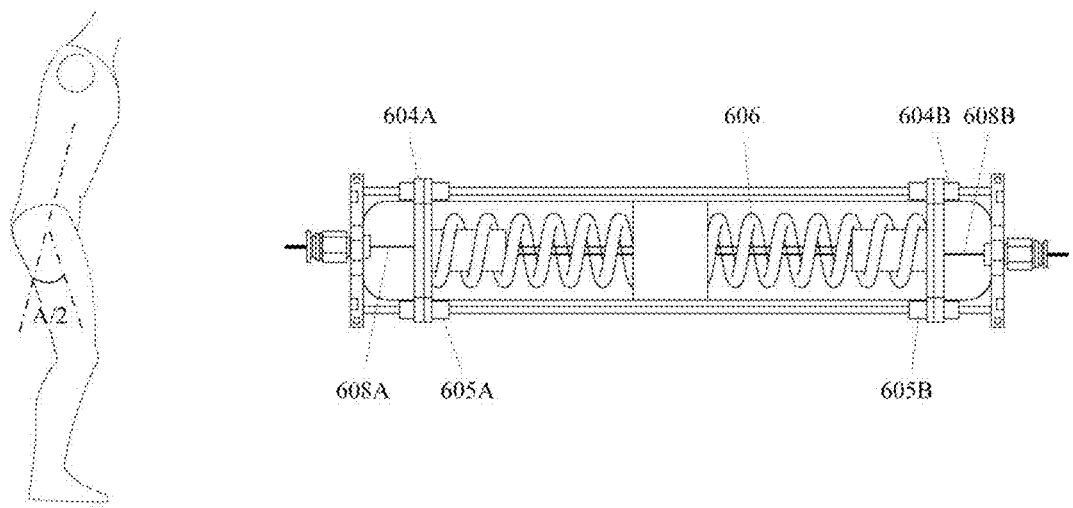
FIG. 14 shows the state of the torque generator when a user bends or squats and the angle between the trunk and thighs is reduced by A/2 provided by a first embodiment of the present application.

FIG. 14 shows the state of the torque generator when a user bends or squats and the angle between the trunk and thighs is reduced by A/2. The outer sliding plate 604 A and 604B are respectively pulled by the Bowden cables 608B and 608A to the middle, until the outer sliding plate 604A contacts the inner sliding plate 605A and the outer sliding plate 604B contacts the inner sliding plate 605B. At this time, the distance between the outer sliding plates 604A and 604B equals to the initial length of the compression spring 606 adding the thickness of the inner sliding plates 605A and 605B. The compression spring 606 is not compressed and the force on the Bowden cables 7 is very small (the pretension force). Thus, the device does not apply torque to the user.

Figure 15:
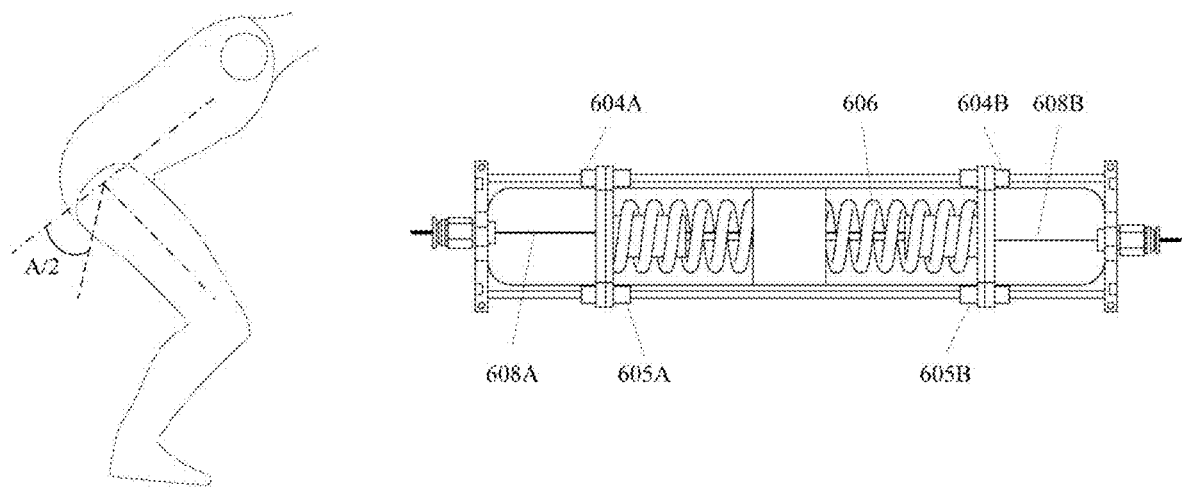
FIG. 15 shows the state of the torque generator when a user bends or squats and the angle between the trunk and thighs is reduced by more than A/2 provided by a first embodiment of the present application.

FIG. 15 shows the state of the torque generator when a user bends or squats and the angle between the trunk and thighs is reduced by more than A/2. The outer sliding plate 604 A and 604B are respectively pulled by the Bowden cables 608B and 608A to the middle. The distance between the outer sliding plates 604A and 604B will be smaller the initial length of the compression spring 606 adding the thickness of the inner sliding plates 605A and 605B. The compression spring 606 is compressed and generates an assist torque at the hip joint hinges 5 to reduce the moment burden of the waist joint.

In a Second Embodiment of the Present Application

Figure 16:
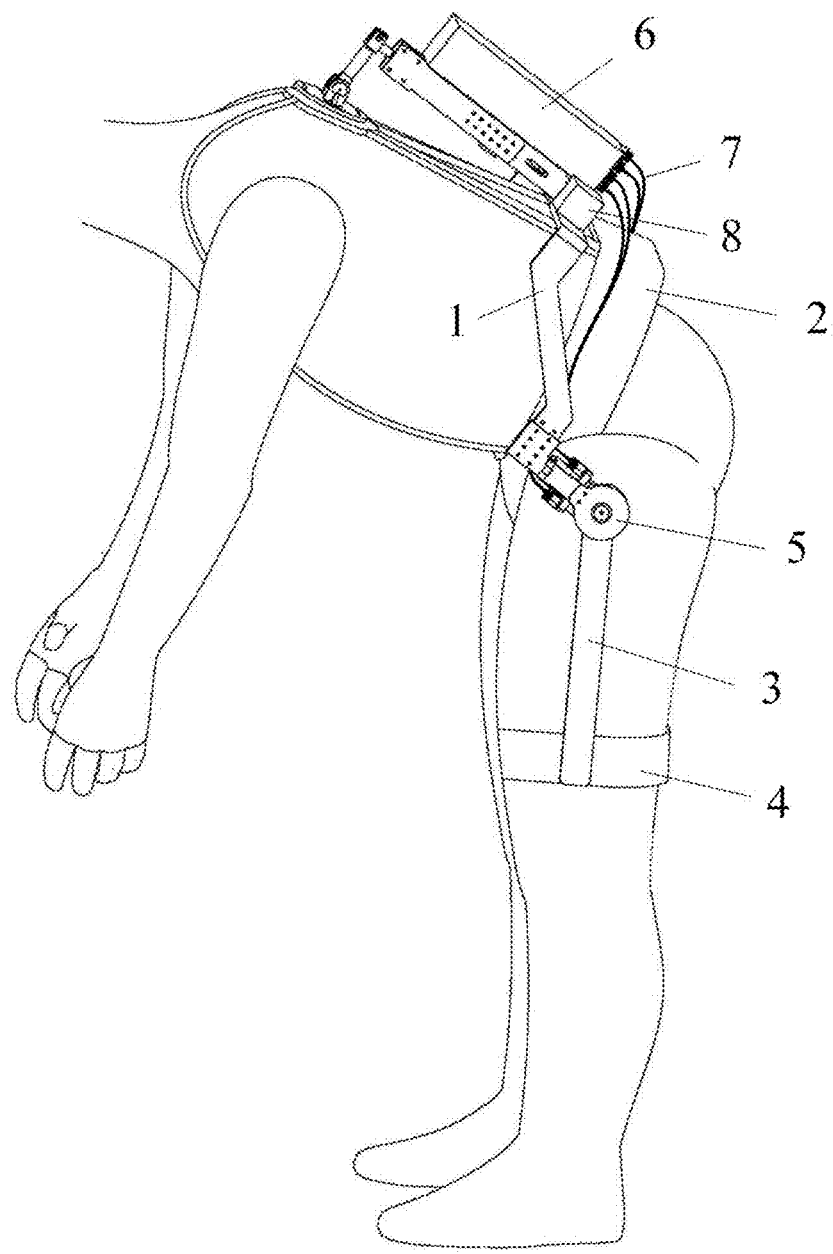
FIG. 16 shows a side view of a device for human trunk assistance that is worn by a user in lifting work provided by a second embodiment of the present application.
Figure 17:
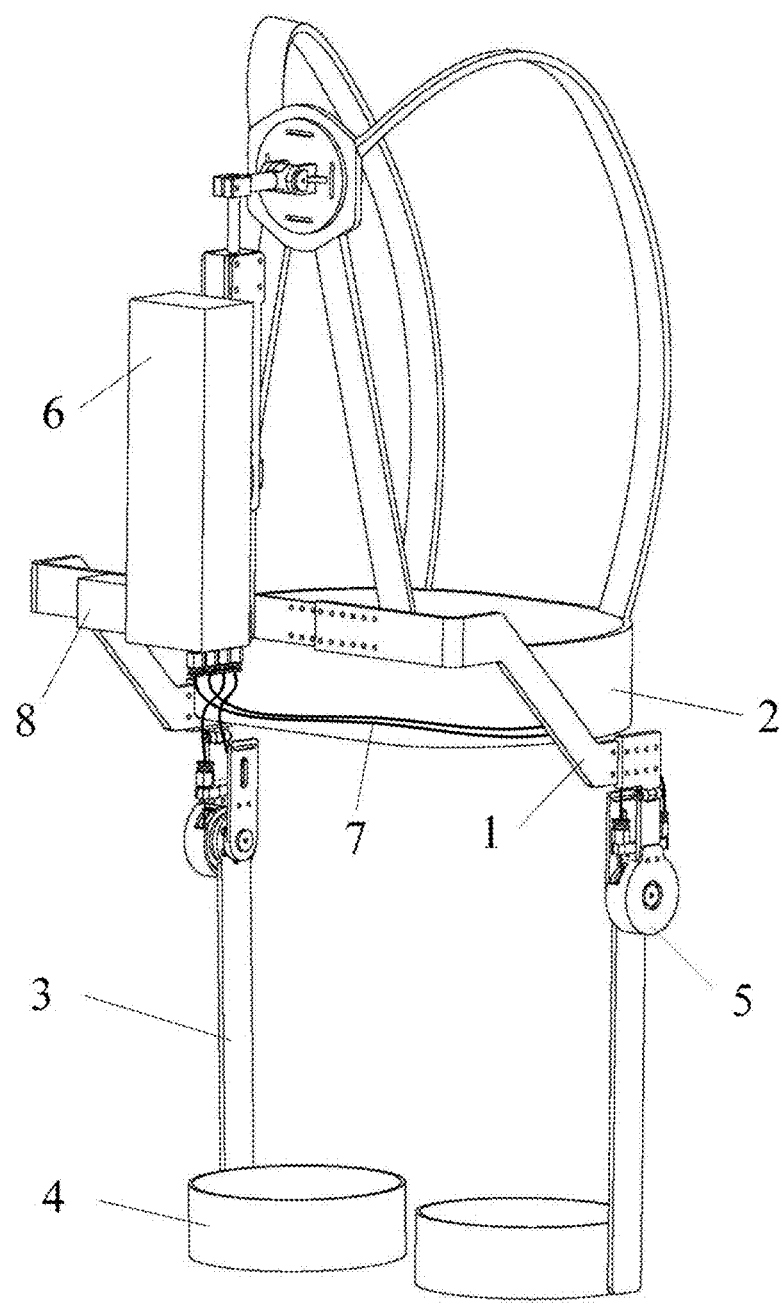
FIG. 17 shows a side view of a device for human trunk assistance provided by a second embodiment of the present application.

FIG. 16 shows a side view of a device for human trunk assistance that is worn by a user in lifting work. The device includes a trunk link 1, back straps 2, two thigh links 3, leg straps 4, two hip Joint hinges 5, a torque generator 6, Bowden cables 7 and a sensing and control box 8. The trunk link 1 is coupled to the user's upper back by back straps 2 and two thigh links 3 are coupled to the user's left and right thighs by leg straps 4, respectively. Two hip joint hinges 5 are placed align to the user's left and right hip joints respectively, rotatably coupling the trunk link 1 and thigh links 3. A torque generator 6 is installed on the trunk link 1 and drives both hip joint hinges 5 via Bowden cables 7. A sensing and control box (with a battery) 8 is also installed on the trunk link 1 and provide the control signal and energy to the torque generator 6. FIG. 17 schematically shows a side view of the device for human trunk assistance.

Figure 18:
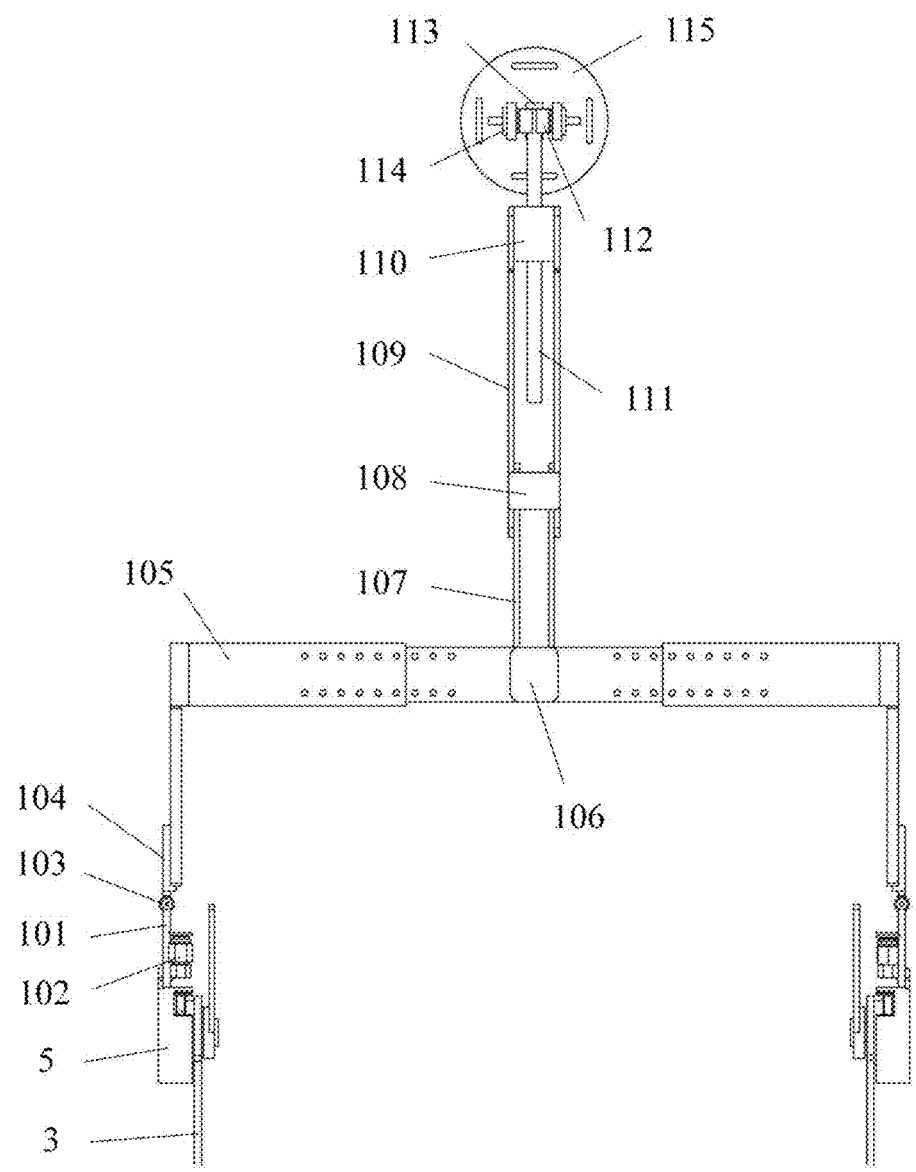
FIG. 18 shows a back view of the trunk link, where the torque generator, back straps and Bowden cables are hidden provided by a second embodiment of the present application.
Figure 19:
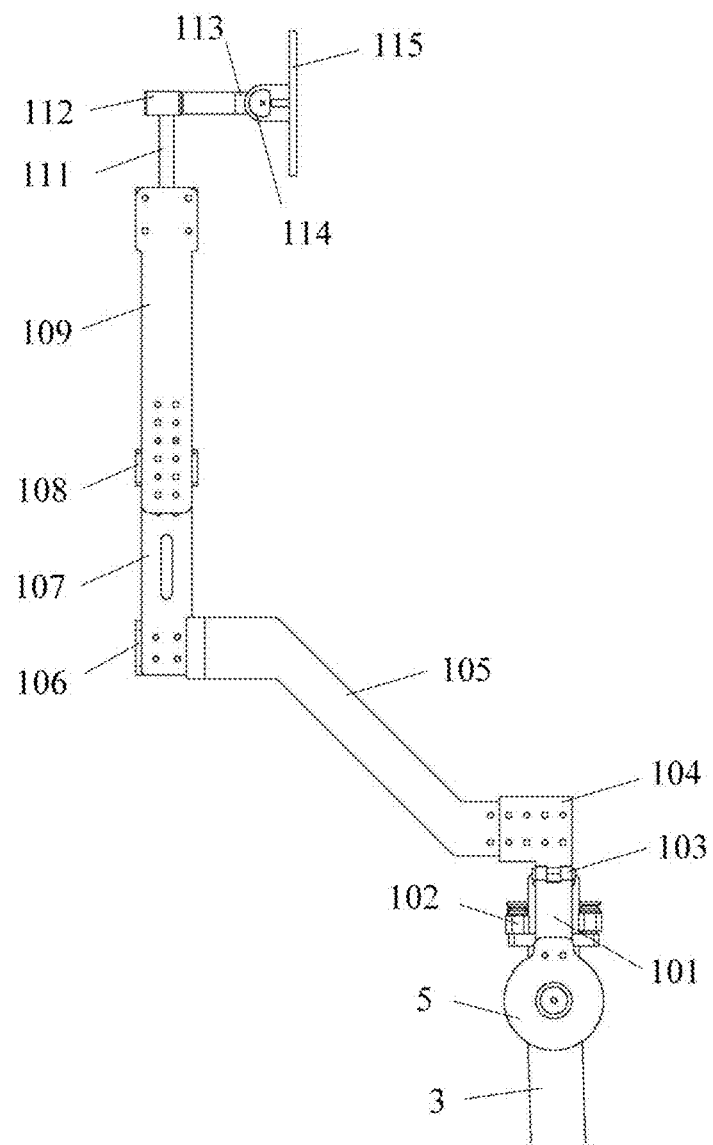
FIG. 19 shows a side view of the trunk link, where the torque generator, back straps and Bowden cables are hidden provided by a second embodiment of the present application.
Figure 20:
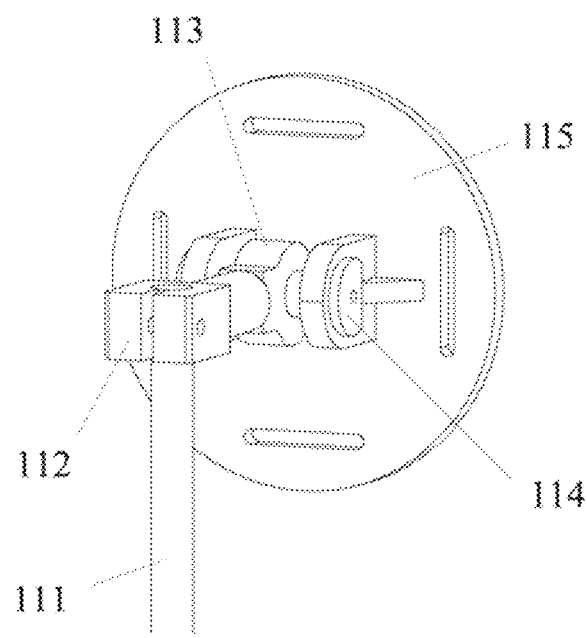
FIG. 20 shows a close-up view of the upper end of the trunk link.
Figure 21:
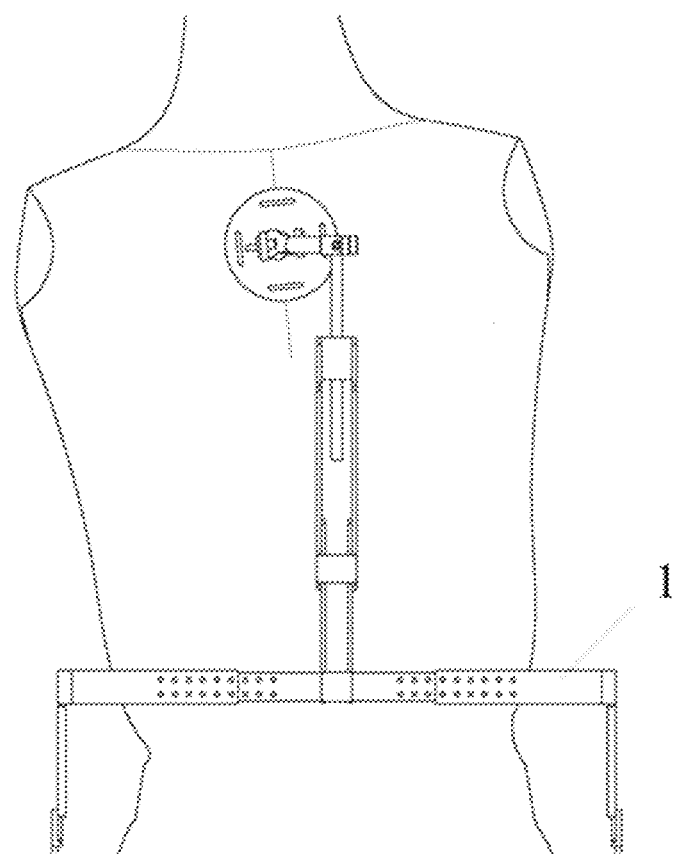
FIG. 21 schematically shows the device adapts to the tilting movement of the torso, where the torque generator, back straps and Bowden cables are hidden provided by a second embodiment of the present application.
Figure 22:
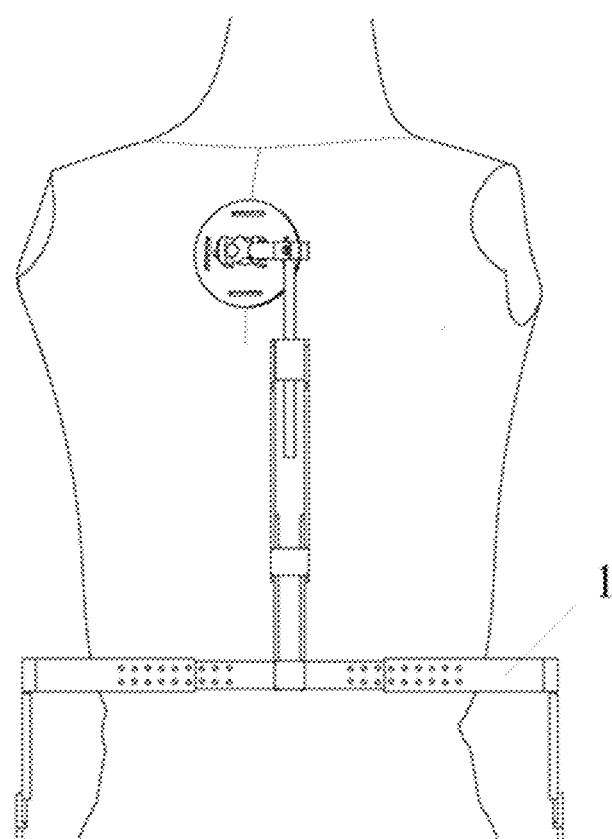
FIG. 22 schematically shows the device adapts to the turning movement of the torso, where the torque generator, back straps and Bowden cables are hidden provided by a second embodiment of the present application.

FIG. 18 and FIG. 19 respectively show the back and side view of the trunk link, where the torque generator, back straps, Bowden cables and the sensing and control box are hidden. FIG. 20 shows a close-up view of the upper end of the trunk link. The trunk link 1 includes two hip links 101 that are rotatably coupled with the left and right hip joint hinges 5, respectively. Four cable connectors 102 are respectively fixed on the left and right hip links 101 to connect the Bowden cables 7. Two upper hip links 104 are rotatably coupled with the left and right hip links 101 respectively by the upper hip joint hinges 103. This can allow the abduction and adduction motions of the legs. Two waist links 105 respectively connect to the left and right upper hip links 104, then are fixed to a waist connector 106. Two low back links 107 are fixed on the waist connector 106 and connect the upper back links 109 by a middle connector 108. The size of the device can be changed and adapts to different body shapes by adjusting the relative position of the links. A linear bearing 110 is support by the upper back links 109 and linearly couples with a back shaft 111. A connect rod 112 is locked with the back shaft 111 in one end and connects a universal bearing 113 in the other end. The universal bearing 113 is rotatably coupled with an upper back plate 115 by an upper back hinge 114. When the user moves the torso, the back shaft 111 slides and rotates relative to the linear bearing 110 and the universal bearing 113 rotates relative to the upper back plate 115, thereby the upper back plate 115 can follow the position change of the upper back. As shown in FIG. 21 and FIG. 22, the device adapts to not only the bending movement but also the tilting and turning movements of the torso.

Figure 23:
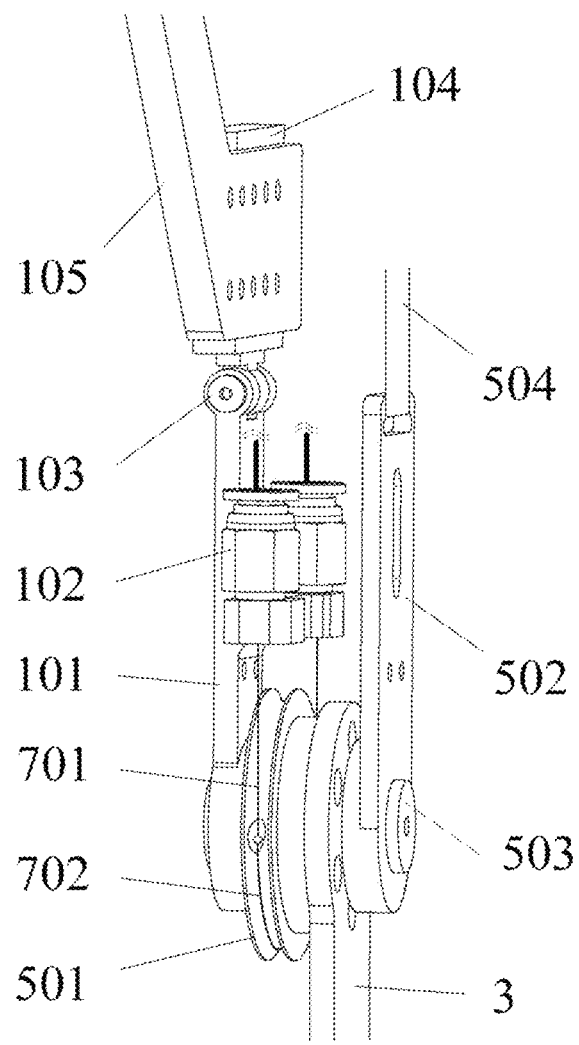
FIG. 23 shows a close-up view of the hip joint hinge, where the hip joint hinge shell is hidden provided by a second embodiment of the present application.

FIG. 23 shows a close-up view of the hip joint hinge, where the hinge shell is hidden. The hip joint hinge 5 includes a pulley 501 which is fixed with the leg link 3 and rotatably coupled with the hip link 101 by shaft and bearings. A hinge support 502 is also rotatably coupled with the pulley 501 and connects the back straps 2 via bandage 504. Two end caps 503 are used to lock the axial position of the bearings. One end of the outgoing Bowden cable 701 and the returning Bowden cable 702 is stuck in the small hole on the pulley 501 and the other end connects the torque generator 6.

Figure 24:
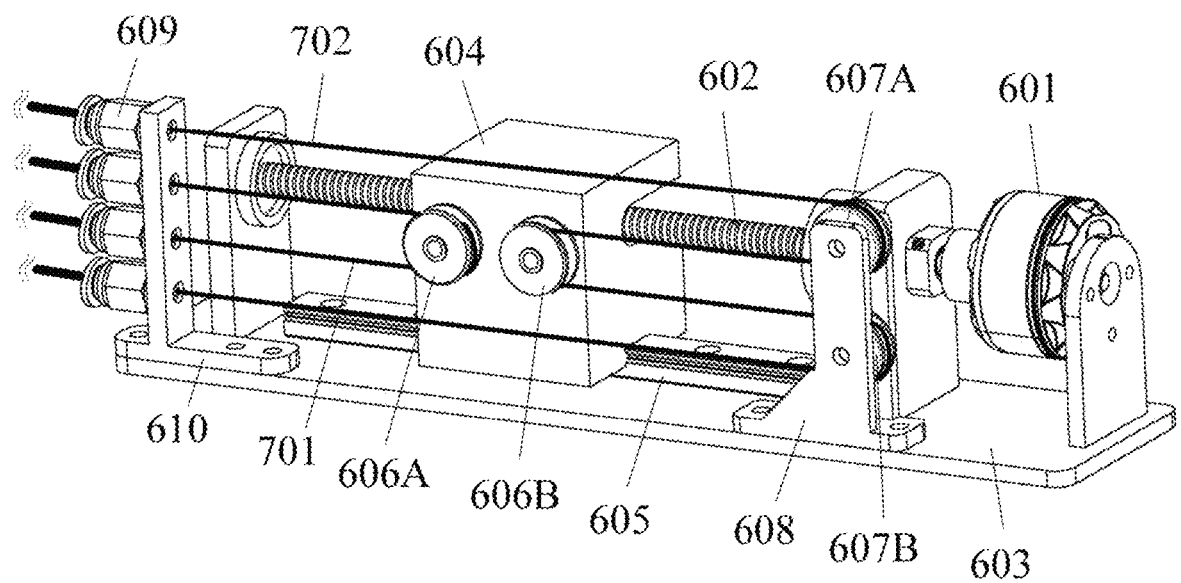
FIG. 24 shows a close-up view of one embodiment of the torque generator, where the protect shell is hidden provided by a second embodiment of the present application.
Figure 25:
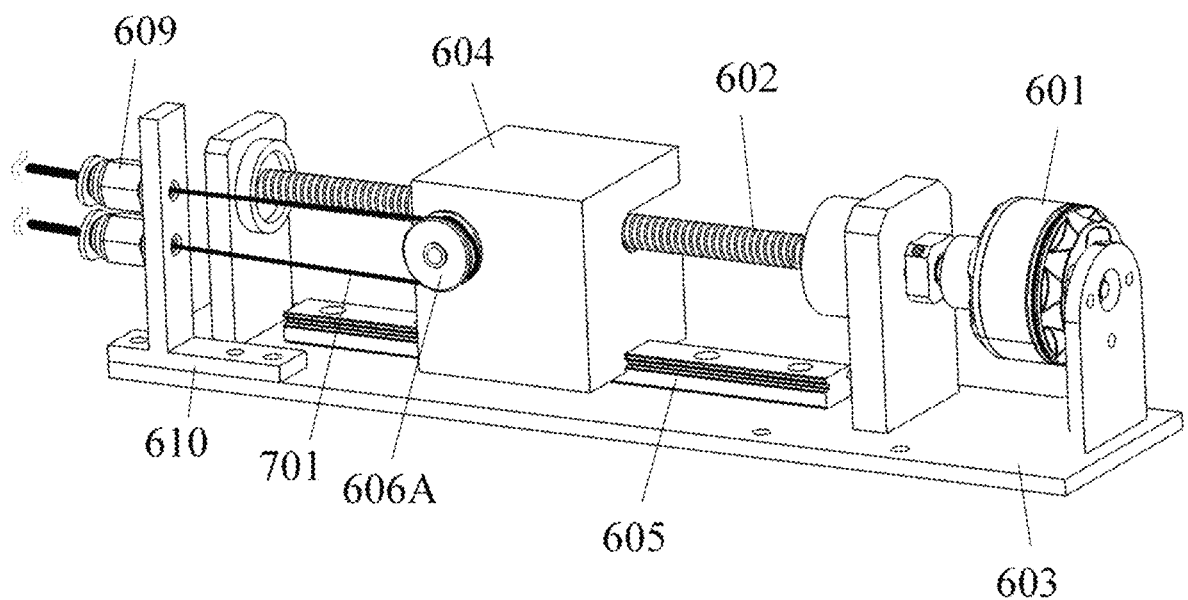
FIG. 25 shows a close-up view of a simplified embodiment of the torque generator presented in FIG. 24, where the protect shell is hidden provided by a second embodiment of the present application.

FIG. 24 shows a close-up view of one embodiment of the torque generator, where the protect shell is hidden. The torque generator 6 includes a motor 601 and a ball screw 602 fixed on a base plate 603 as the prime mover, which drives a slider 604 to move along a slide rail 605. Two rollers 606A and 606B, one for an outgoing Bowden cable 701 and one for a returning Bowden cable 702, are installed on the slider 604. The outgoing Bowden cable 701 is wound on the roller 606A and its two ends respectively connect the pulleys 501 inside the left and right hip joint hinges 5, providing a resistance moment between the trunk link 1 and thigh links 3. The returning Bowden cable 702 is wound on the other roller 606B and its two ends also connect the pulleys 501 inside the left and right hip joint hinges 5 respectively, ensuring the outgoing Bowden cable 701 is not loose. Another two rollers 607A and 607B are fixed on a roller base 608 to guide the direction of the returning Bowden cable 702. Four cable connectors 609 are fixed on a L-shape base 610 for cable connection. This embodiment can also be simplified to one direction actuation as shown in FIG. 25. The motor 601 only drives the slider 604 move backward and pulls the outgoing Bowden cable 701.

Figure 26:
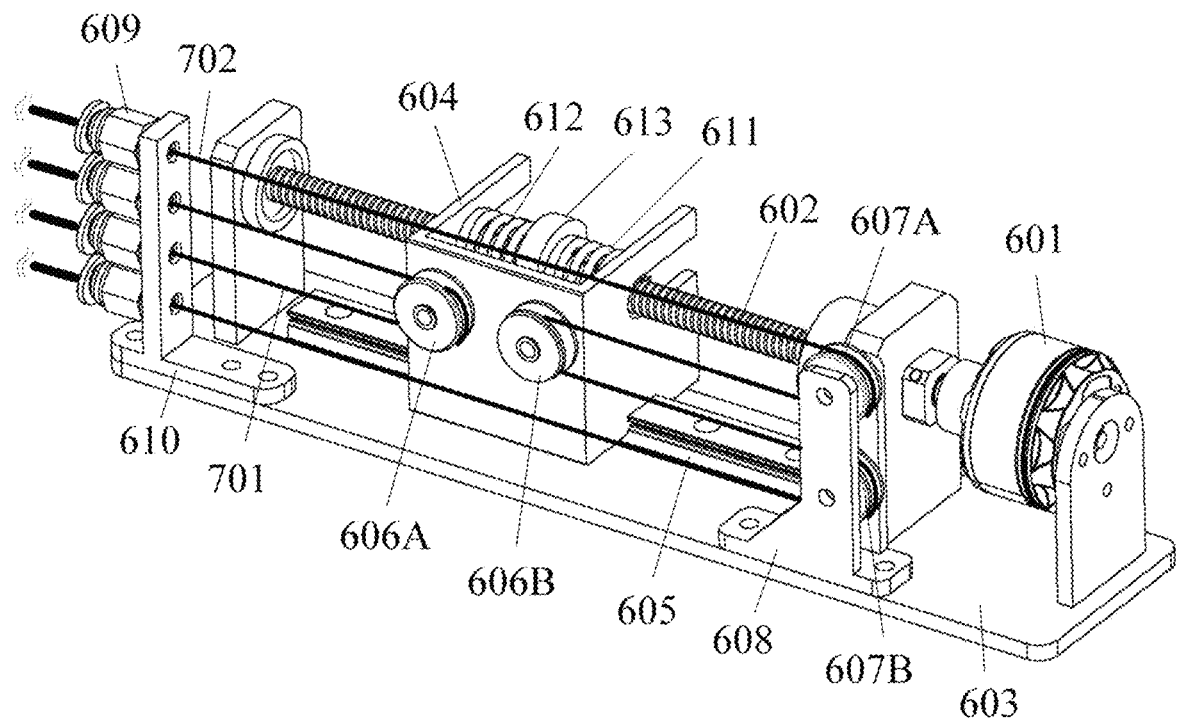
FIG. 26 shows a close-up view of a compliant embodiment of the torque generator presented in FIG. 24, where the protect shell is hidden provided by a second embodiment of the present application.

In above embodiment, two springs 611 and 612 can be added between the sliding part 613 of the ball screw 602 and the slider 604, as shown in FIG. 26. The force on the Bowden cables can be ensured by controlling the deformation of the springs 611 and 612.

Figure 27:
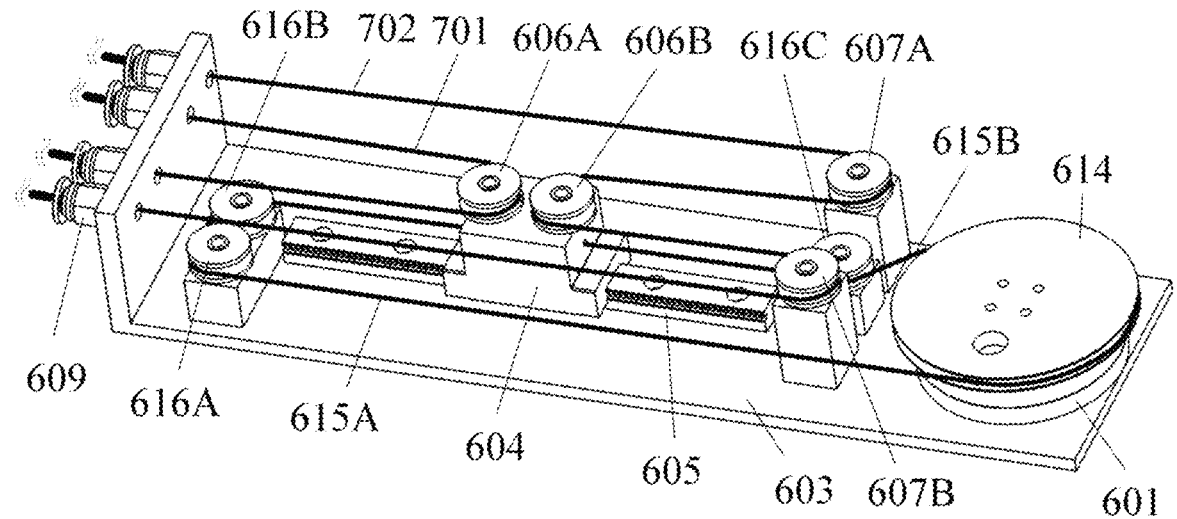
FIG. 27 shows a close-up view of another embodiment of the torque generator, where the protect shell is hidden provided by a second embodiment of the present application.
Figure 28:
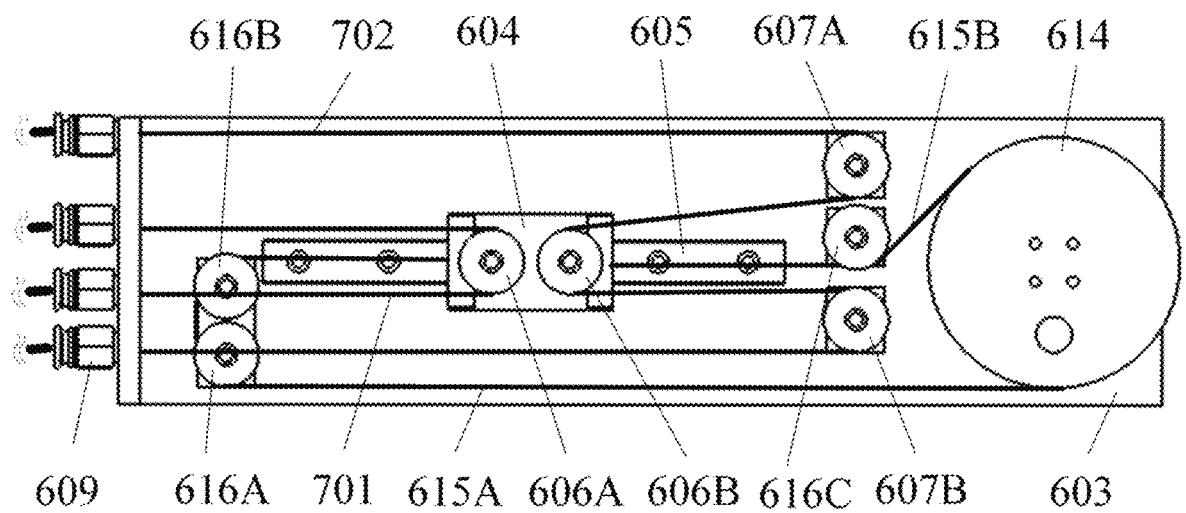
FIG. 28 shows a top view of the torque generator presented in FIG. 27, where the protect shell is hidden provided by a second embodiment of the present application.
Figure 29:
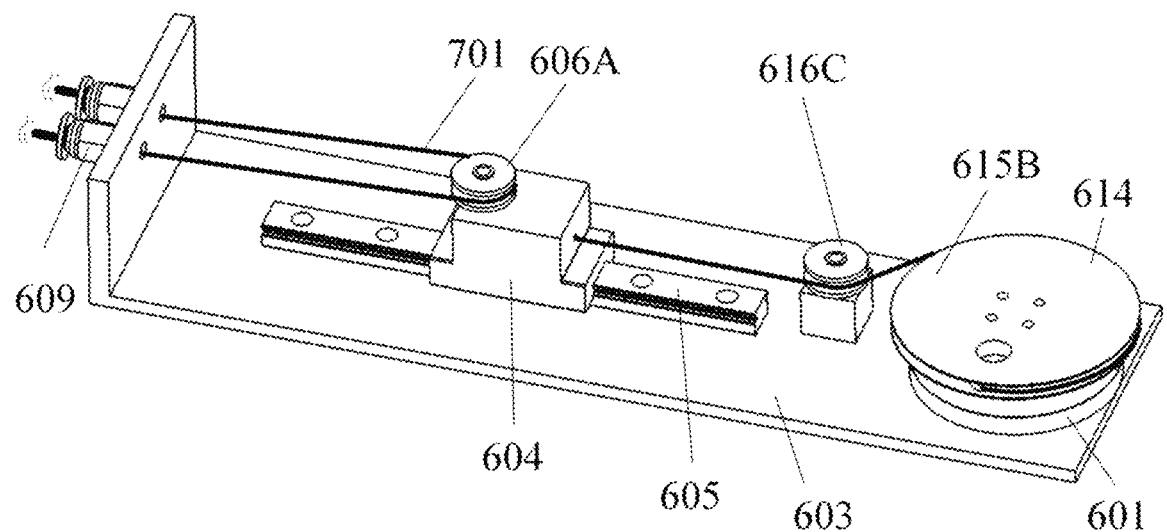
FIG. 29 shows a close-up view of a simplified embodiment of the torque generator presented in FIG. 27, where the protect shell is hidden provided by a second embodiment of the present application.

FIG. 27 shows a close-up view of another embodiment of the torque generator, where the protect shell is hidden. FIG. 28 shows a top view of the torque generator, where the protect shell is hidden. The torque generator 6 includes a motor 601 as the prime mover and a slide rail 605 fixed on a base plate 603. Two rollers 606A and 606B are fixed on a slider 604 which can move along the slide rail 605. The outgoing Bowden cable 701 is wrapped around the roller 606A and the returning Bowden cable 702 is wrapped around the roller 606B. Another two rollers 607A and 607B are fixed on the base 603 to guide the direction of the returning Bowden cable 702. Four cable connectors 609 are fixed on the base 603 for cable connection. A prime pulley 614 is coupled with the motor 601. One end of a forward cable 615A and a backward cable 615B are fixed on the prime pulley 614. The forward cable 615A is guided by two lower rollers 616A and 616B and connects the slider 604. The backward cable 615B is guided by a lower roller 616C and connects the slider 604. In operation, the motor 601 drives the prime pulley 614 to pull the backward cable 615B and the slider 604 will move backward, then the outgoing Bowden cable 701 will be pulled. If the motor 601 rotates in the opposite direction, the forward cable 615A will be pulled and the slider 604 will move forward, then the returning Bowden cable 702 will be pulled. This embodiment can also be simplified to one direction actuation as shown in FIG. 29. The motor 601 only drives the slider 604 move backward and pulls the outgoing Bowden cable 701.

Figure 30:
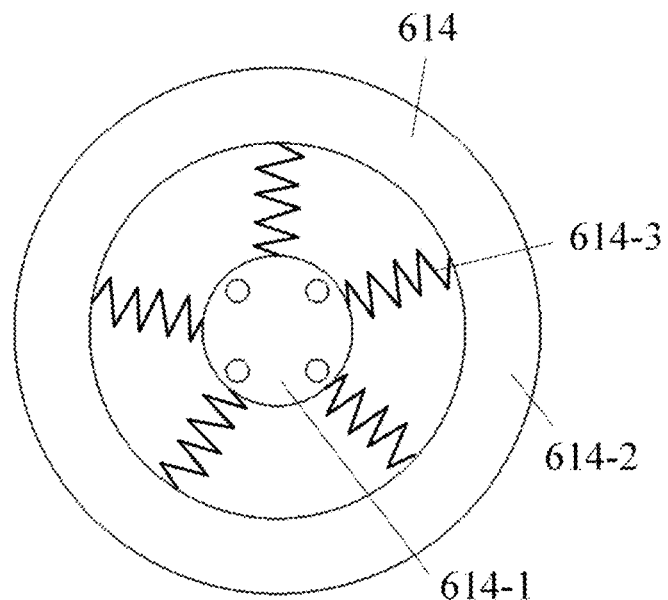
FIG. 30 shows a close-up view of a compliant embodiment of the prime pulley provided by a second embodiment of the present application.

In above embodiment, elastic elements (such as torsion spring) can be added between the motor 601 and the prime pulley 614. The prime pulley 614 can also be designed as an elastic element, and one embodiment is shown in FIG. 30. The prime pulley 614 includes an inner ring 614-1 and an outer ring 614-2. The inner ring 614-1 is coupled with the motor and the outer ring 614-2 is connected with the cables 615A and 615B. Springs 614-3 are installed between the inner ring 614-1 and outer ring 614-2. In operation, the motor 601 drives the inner ring 614-1 and generates an angle shift between the inner ring 614-1 and the outer ring 614-2, thereby the length of the springs 614-3 is changed. The torque between the inner ring 614-1 and the outer ring 614-2 is a function of the angle shift which can be measured by the sensors.

Figure 31:
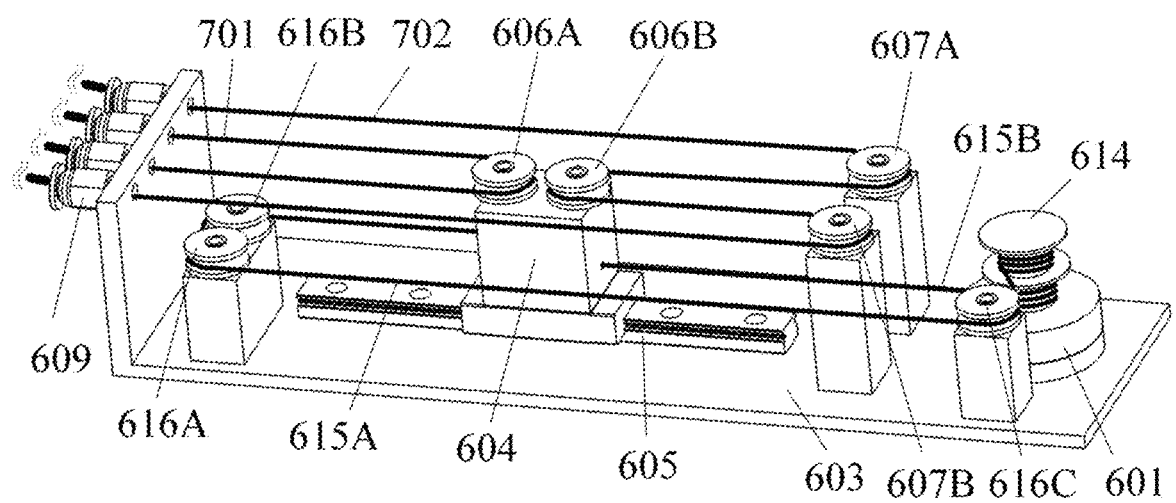
FIG. 31 shows a close-up view of another embodiment of the torque generator, where the protect shell is hidden provided by a second embodiment of the present application.
Figure 32:
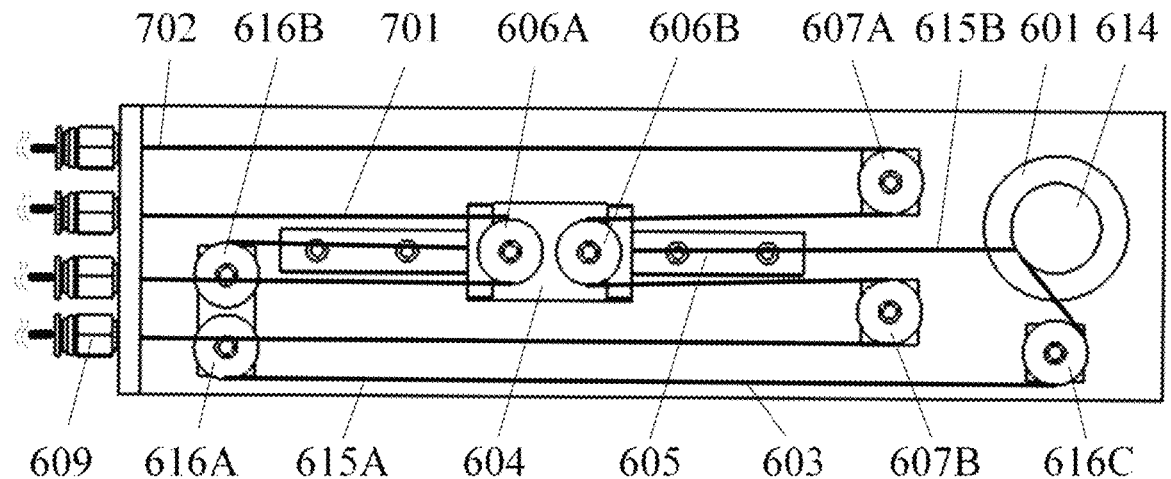
FIG. 32 shows a top view of the torque generator presented in FIG. 31, where the protect shell is hidden provided by a second embodiment of the present application.
Figure 33:
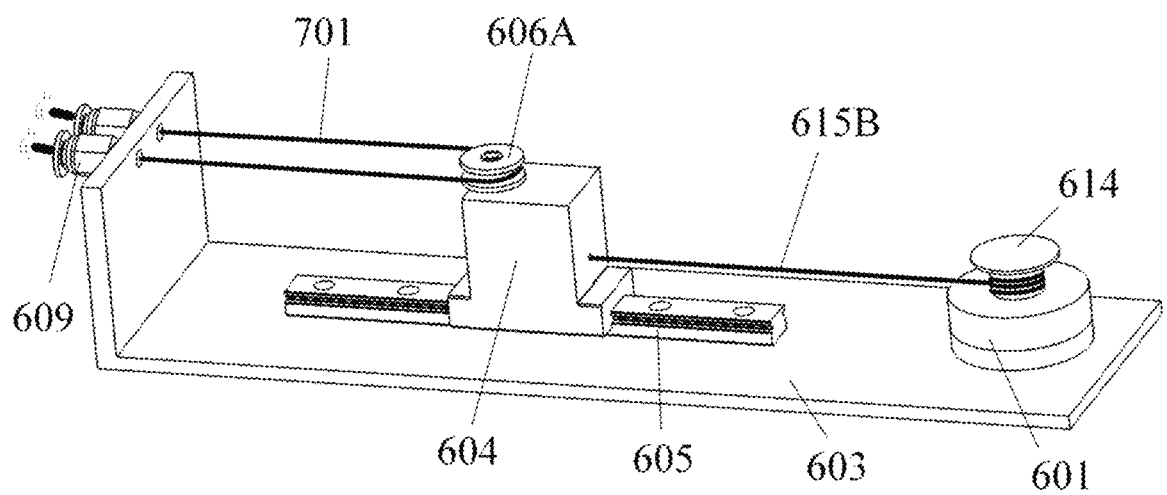
FIG. 33 shows a close-up view of a simplified embodiment of the torque generator presented in FIG. 31, where the protect shell is hidden provided by a second embodiment of the present application.

FIG. 31 shows a close-up view of another embodiment of the torque generator, where the protect shell is hidden. FIG. 32 shows a top view of the torque generator, where the protect shell is hidden. The torque generator 6 includes a motor 601 as the prime mover and a slide rail 605 fixed on a base plate 603. Two rollers 606A and 606B are fixed on a slider 604 which can move along the slide rail 605. The outgoing Bowden cable 701 is wrapped around the roller 606A and the returning Bowden cable 702 is wrapped around the roller 606B. Another two rollers 607A and 607B are fixed on the base 603 to guide the direction of the returning Bowden cable 702. Four cable connectors 609 are fixed on the base 603 for cable connection. A prime pulley 614 is coupled with the motor 601. One end of a forward cable 615A and a backward cable 615B are fixed on the two layers of the prime pulley 614, respectively. The winding direction of the cables 615A and 615B is opposite. The forward cable 615A is guided by three lower rollers 616A, 616B and 616C, then connects the slider 604. The backward cable 615B connects the slider 604. In operation, the motor 601 drives the prime pulley 614 to pull the backward cable 615B and the slider 604 will move backward, then the outgoing Bowden cable 701 will be pulled. If the motor 601 rotates in the opposite direction, the forward cable 615A will be pulled and the slider 604 will move forward, then the returning Bowden cable 702 will be pulled. In this embodiment, elastic elements (such as torsion spring) can be added between the motor 601 and the prime pulley 614. This embodiment can also be simplified to one direction actuation as shown in FIG. 33. The motor 601 only drives the slider 604 move backward and pulls the outgoing Bowden cable 701.

In all embodiments, the differential drive is achieved by 1) since the force on one Bowden cable is always equal, the assist torque on the left and right hip joint hinges 5 will be same; 2) when the two legs move differentially, the rollers 606A and 606B will automatically rotate to compensate for the cable length difference between the left and right sides.

In all embodiments, the prime mover 601 can also be a hydraulic cylinder, a pneumatic cylinder and so on.

Figure 34:
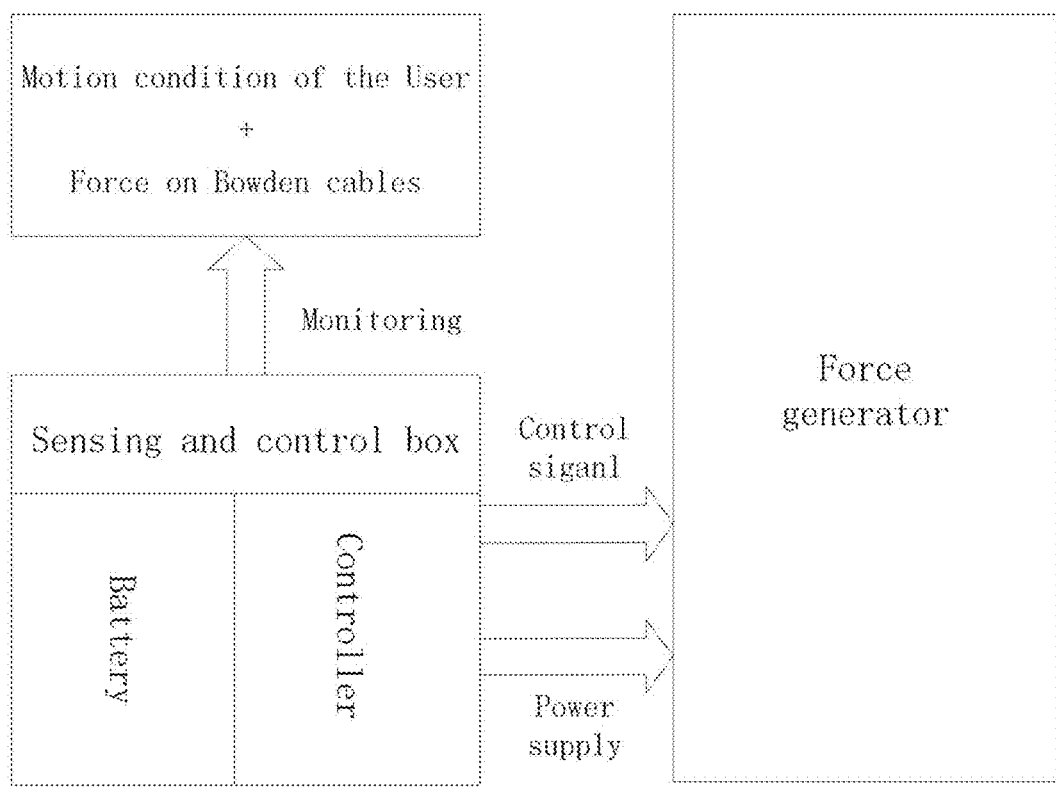
FIG. 34 schematically shows the working principle of the device provided by a second embodiment of the present application.

FIG. 34 schematically shows the working principle of the device. In operation, the sensing and control box 8 will monitor the motion condition of a user and the force on Bowden cables 7. If a user is in working conditions, i.e. the user bends over to lift loads and needs trunk support, the sensing and control box 8 will send a control signal to the torque generator 6 to tension the outgoing Bowdon cable 701 and provide an appropriate assist torque between the trunk link 1 and thigh links 3. If a user is in non-working conditions, the torque generator 6 will ensure the force of the Bowden cables 7 are nearly zero and let the user feel comfortable (no resistance) in daily activities.

The device of the second embodiment can be lighter and ensures the synchronization of the left and right sides of the user.

The aforementioned embodiments are only preferred embodiments of the present application, and should not be regarded as being limitation to the present application. Any modification, equivalent replacement, improvement, and so on, which are made within the spirit and the principle of the present application, should be included in the protection scope of the present application.

What is claimed is:

1. A device for human trunk assistance, comprising:
   a trunk link, coupled to an upper back of a user through back straps;
   two thigh links, coupled to left and right thighs of the user through leg straps respectively;
   two hip joint hinges, placed so as to align to left and right hip joints of the user respectively, and configured for rotatably coupling the trunk link and the two thigh links; and
   a torque generator, coupling to the two hip joint hinges through Bowden cables, and configured to generate an assist torque to reduce moment burden to the user,
   wherein the trunk link comprises:
      two hip links, rotatably coupled with the two hip joint hinges, respectively;
      two cable connectors, respectively fixed on the two hip links and configured to connect the Bowden cables;
      two upper hip links, rotatably coupled with the two hip links respectively by upper hip hinges;
      two waist links, respectively connect to the two upper hip links, then are fixed to a waist connector; and
      a back link, an end of the back link being fixed on the waist connector, and the other end of the back link being rotatably coupled with an upper back plate, and the upper back plate is configured for following a position change of an upper back of the user.

2. The device as claimed in claim 1, wherein each of the hip joint hinges comprises:
   a pulley, which is fixed with the thigh link and rotatably coupled with the hip link;
   a hinge support, rotatably coupled with the pulley and connects the back straps; and
   two end caps, configured to lock an axial position of the pulley.

3. The device as claimed in claim 2, wherein one end of one of the Bowden cables is stuck in the pulley and the other end connects the torque generator.

4. The device as claimed claim 1, wherein the torque generator is attached to a waist position and drives the two hip joint hinges by the Bowden cables.

5. The device as claimed in claim 4, wherein the torque generator comprises:
   a support plate,
   two shaft bases, respectively fixed on two ends of the support plate;
   two outer sliding plates, being a first outer sliding plate and a second outer sliding plate, movably between the two shaft bases;
   two inner sliding plates, movably between two outer sliding plates; and
   a compression spring, attached between the inner sliding plates;
   wherein one end of a first one of the Bowden cables is fixed to the first outer sliding plate and the other end connects to a first one of the hip joint hinges, and
   wherein one end of a second one of the Bowden cables is fixed to the second outer sliding plate and the other end connects a second one of the hip joint hinges.

6. The device as claimed in claim 5, wherein the torque generator further comprises:
   two shafts, placed parallel to each other and are supported by the shaft bases; and
   the two outer sliding plates and the two inner sliding plates are connected to the shafts and are able to move smoothly along the shafts.

7. The device as claimed in claim 5, wherein the torque generator further comprises:
   a spring sleeve, fixed on a middle of the support plate and is further configured to guide the compression spring.

8. The device as claimed in claim 5, wherein torque generator further comprises:
   elastic ropes, connected between the outer sliding plates and fixed points of the device, and configured to tension the Bowden cables.

9. The device as claimed in claim 5, wherein the outer sliding plates are at preset initial positions when the user stands straight, and a distance between the outer sliding plates is larger than an initial length of the compression spring.

10. The device as claimed in claim 5, wherein when the user raises one leg to a predetermined angle A, the compression spring does not compress, where at the predetermined angle A, one of the outer sliding plates is pulled by its associated one of the Bowden cables to contact with the corresponding inner sliding plate.

11. The device as claimed in claim 10, wherein when the user bends or squats and an angle between the trunk and thighs is reduced by less than or equal to A/2, the compression spring does not compress, and when the user bends or squats and an angle between the trunk and thighs is reduced by more than A/2, the compression spring is compressed and generates an assist torque at the hip joint hinges to reduce moment burden of a waist joint of the user.

12. The device as claimed in claim 1, wherein the torque generator is installed on the trunk link and drives both hip joint hinges via the Bowden cables, and device further comprises a sensing and control box, and the sensing and control box is also installed on the trunk link and provides control signal and energy to the torque generator.

13. The device as claimed in claim 12, wherein the torque generator comprises:
   a prime mover, comprising a motor and a ball screw fixed on a base plate, the base plate being provided with a slide rail; and
   a slider, connected to the ball screw and movable along the slide rail by the prime mover;
   wherein the Bowden cables are connected between the slider and the hip joint hinges so as to provide a resistance moment between the trunk link and thigh links.

14. The device as claimed in claim 13, wherein the Bowden cables comprises an outgoing Bowden cable and a returning Bowden cable, and the torque generator further comprises two rollers, one for the outgoing Bowden cable and one for the returning Bowden cable, are installed on the slider; the outgoing Bowden cable is wound on the roller and its two ends respectively connect the two hip joint hinges, and the returning Bowden cable is wound on the other roller and its two ends also connect the two hip joint hinges respectively.

15. The device as claimed in claim 13, wherein the Bowden cables comprises an outgoing Bowden cable, and the torque generator further comprises a roller for the outgoing Bowden cable, is installed on the slider; the outgoing Bowden cable is wound on the roller and its two ends respectively connect the two hip joint hinges, and the slider moves backward and pulls the outgoing Bowden cable by the motor.

16. The device as claimed in claim 12, wherein the torque generator comprises:
   a base plate;
   a prime mover, comprising a motor fixed on the base plate;
   a slide rail, fixed on the base plate;
   a slider, movable along the slide rail by the motor; and
   a prime pulley, coupled with the motor;
   wherein the motor drives the prime pulley to pull the Bowden cables to drive the slider moving backward.

17. The device as claimed in claim 16, wherein the prime pulley comprises an inner ring and an outer ring, a plurality of elastic elements are arranged between the inner ring and the outer ring and configured to measure an angle shift between the inner ring and the outer ring.

18. The device as claimed in claim 12, wherein the torque generator comprises a prime mover comprising a hydraulic cylinder, or a pneumatic cylinder, wherein the Bowden cables are connected between the hydraulic cylinder or pneumatic cylinder and the hip joint hinges so as to provide a resistance moment between the trunk link and thigh links.

19. The device as claimed in claim 12, wherein the sensing and control box is configured to monitor a motion condition of the user and a force on the Bowden cables to send a control signal to the torque generator to tension the Bowden cables in a working condition, and to ensure the force of the Bowden cables are zero in a non-working condition.

* * * * *